(12) United States Patent  
Jordan

(10) Patent No.: US 10,933,935 B2
(45) Date of Patent: Mar. 2, 2021

(54) LINEAR ACTUATOR SYSTEM

(71) Applicant: Wolf Tooth Components, LLC, Savage, MN (US)

(72) Inventor: Jeffrey Scott Jordan, Fishers, IN (US)

(73) Assignee: Wolf Tooth Components, LLC, Burnsville, MN (US)

( * ) Notice: Subject to any disclaimer, the term of this patent is extended or adjusted under 35 U.S.C. 154(b) by 0 days.

(21) Appl. No.: 16/373,601

(22) Filed: Apr. 2, 2019

(65) Prior Publication Data

US 2019/0301497 A1   Oct. 3, 2019

Related U.S. Application Data

(60) Provisional application No. 62/651,379, filed on Apr. 2, 2018.

(51) Int. Cl.
| | |
|---|---|
| *B62K 19/36* | (2006.01) |
| *F15B 15/16* | (2006.01) |
| *B62J 1/08* | (2006.01) |
| *F15B 21/044* | (2019.01) |
| *F16B 2/06* | (2006.01) |
| *F15B 11/072* | (2006.01) |

(52) U.S. Cl.
CPC ............ *B62J 1/08* (2013.01); *B62K 19/36* (2013.01); *F15B 15/16* (2013.01); *F15B 21/044* (2013.01); *F16B 2/065* (2013.01); *B62J 2001/085* (2013.01); *F15B 11/072* (2013.01)

(58) Field of Classification Search
CPC ......... B62K 19/36; F15B 15/16; F15B 21/044
USPC ....................................................... 91/167 R
See application file for complete search history.

(56) References Cited

U.S. PATENT DOCUMENTS

| | | |
|---|---|---|
| 3,496,838 A | 2/1970 | Barrett et al. |
| 4,720,085 A | 1/1988 | Shinbori et al. |
| 7,673,936 B2 | 3/2010 | Hsu |
| 8,016,349 B2 | 9/2011 | Mouri et al. |
| 8,177,251 B2 | 5/2012 | Shirai |
| 8,191,964 B2 | 6/2012 | Hsu |

(Continued)

FOREIGN PATENT DOCUMENTS

| | | |
|---|---|---|
| EP | 1799535 | 10/2013 |
| EP | 3290311 | 3/2018 |

(Continued)

*Primary Examiner* — F Daniel Lopez
*Assistant Examiner* — Daniel S Collins
(74) *Attorney, Agent, or Firm* — Dicke, Billig & Czaja, PLLC

(57) ABSTRACT

A linear actuator system includes a linear actuator including an outer body, an inner body disposed within the outer body, a fluid chamber at least partially extending between the inner body and the outer body, a piston chamber extending at least partially within the inner body, a valve configured to selectively fluidly couple the fluid chamber and the piston chamber to each other, a piston assembly including a piston, a variable volume within the piston chamber that extends between the piston and the valve, and a gas collector assembly including a fluid passageway. The piston assembly is disposed within the piston chamber, wherein a movement of the piston assembly causes a gas separated from a liquid within the variable volume to flow through the fluid passageway, through the valve, and into the fluid chamber.

34 Claims, 36 Drawing Sheets

(56) References Cited

U.S. PATENT DOCUMENTS

| | | | |
|---|---|---|---|
| 8,302,983 | B1 | 11/2012 | Hsu |
| 8,308,124 | B2 | 11/2012 | Hsu |
| 8,596,663 | B2 | 12/2013 | Shirai |
| 8,950,771 | B2 | 2/2015 | Felsl et al. |
| 9,027,434 | B2 | 5/2015 | Neeley |
| 9,126,647 | B2 | 9/2015 | Kuo |
| 9,157,523 | B2 | 10/2015 | Miki et al. |
| 9,242,688 | B2 | 1/2016 | McAndrews et al. |
| 9,580,124 | B2 | 2/2017 | Shirai |
| 2006/0066074 | A1 | 3/2006 | Turner |
| 2009/0108642 | A1* | 4/2009 | Hsu .................. B62K 19/36 297/195.1 |
| 2011/0257848 | A1 | 10/2011 | Shirai |
| 2012/0104221 | A1 | 5/2012 | Hsu |
| 2012/0243931 | A1 | 9/2012 | Hsu |
| 2013/0093231 | A1 | 4/2013 | Hsu |
| 2013/0221713 | A1 | 8/2013 | Pelot et al. |
| 2014/0013875 | A1 | 1/2014 | Neeley |
| 2015/0034779 | A1 | 2/2015 | McAndrews et al. |
| 2015/0232142 | A1 | 8/2015 | Shirai |
| 2017/0106928 | A1 | 4/2017 | Madau et al. |
| 2017/0363120 | A1 | 12/2017 | Stander |

FOREIGN PATENT DOCUMENTS

| | | |
|---|---|---|
| WO | WO2016029301 | 3/2016 |
| WO | WO2016113673 | 7/2016 |

* cited by examiner

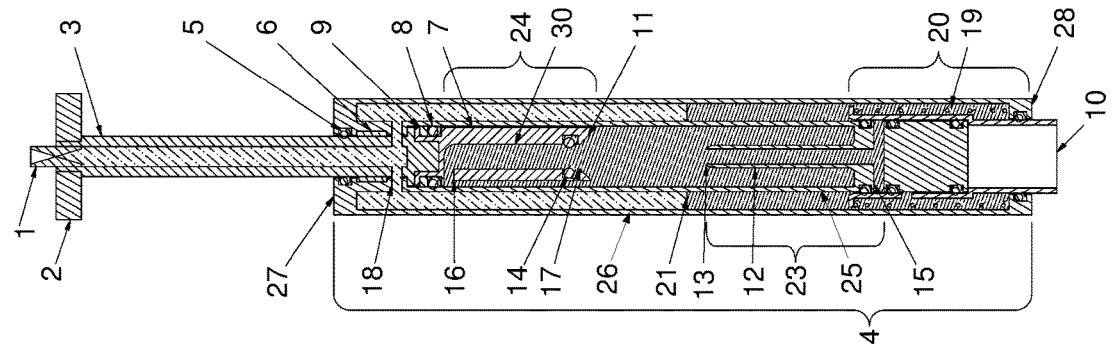
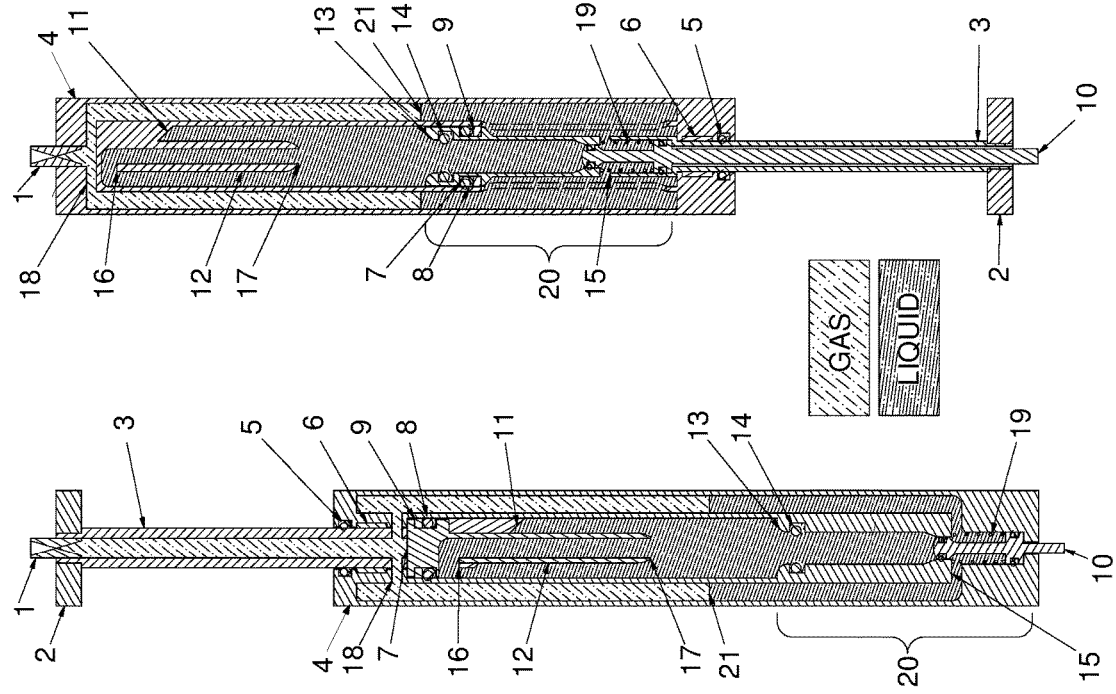
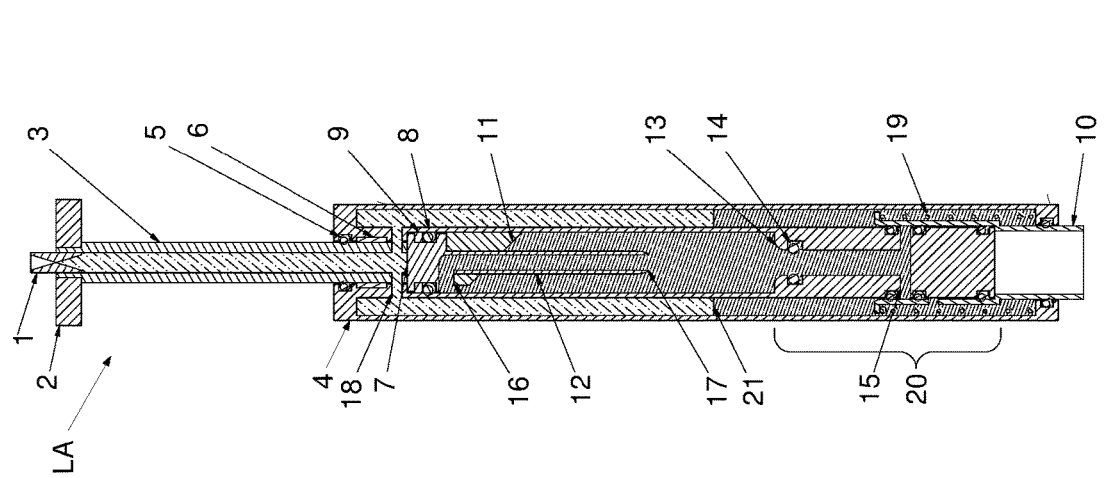

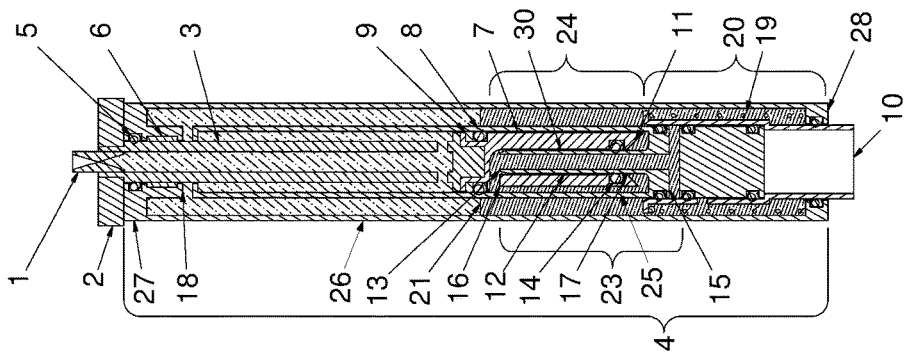
Fig. 3D
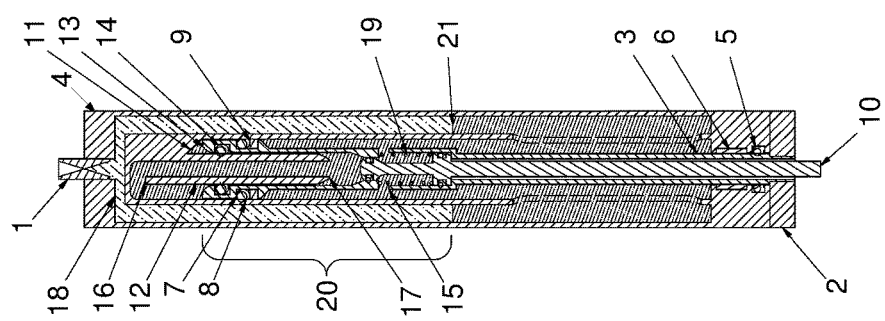
Fig. 3C
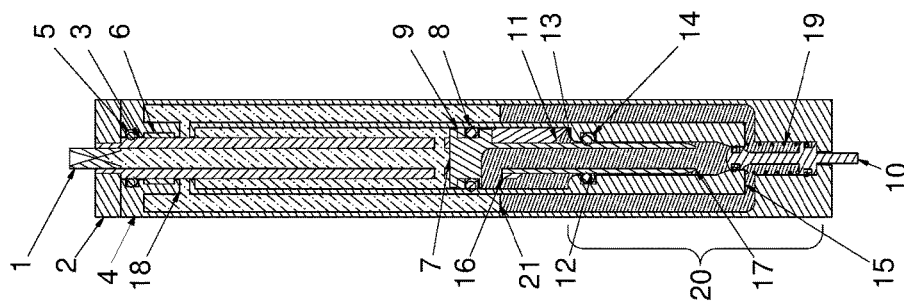
Fig. 3B
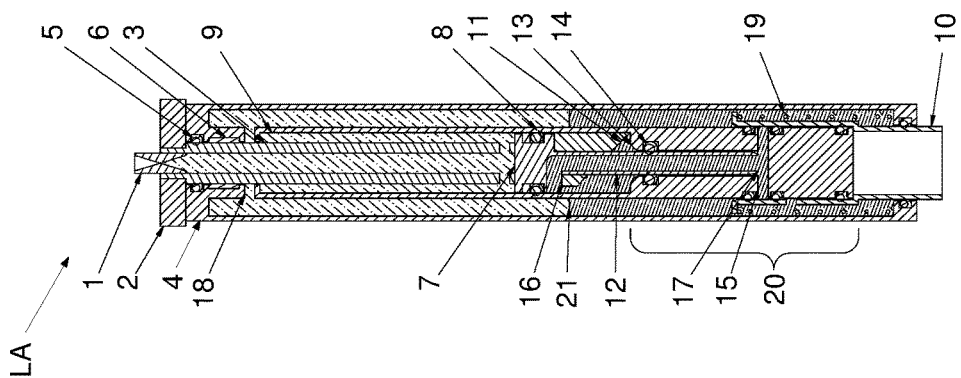
Fig. 3A
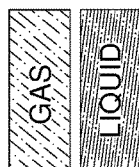

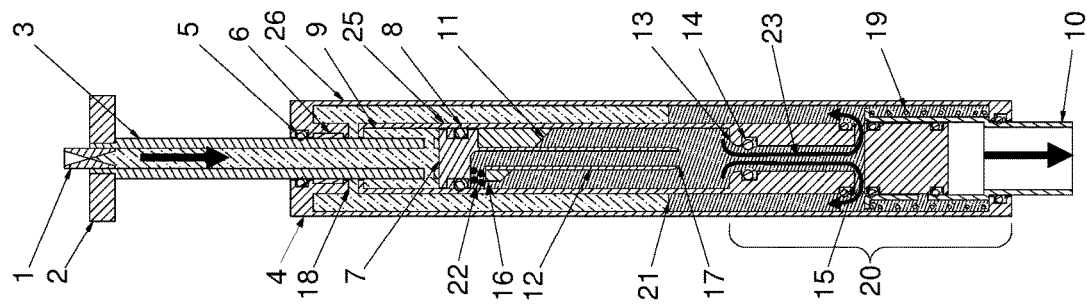
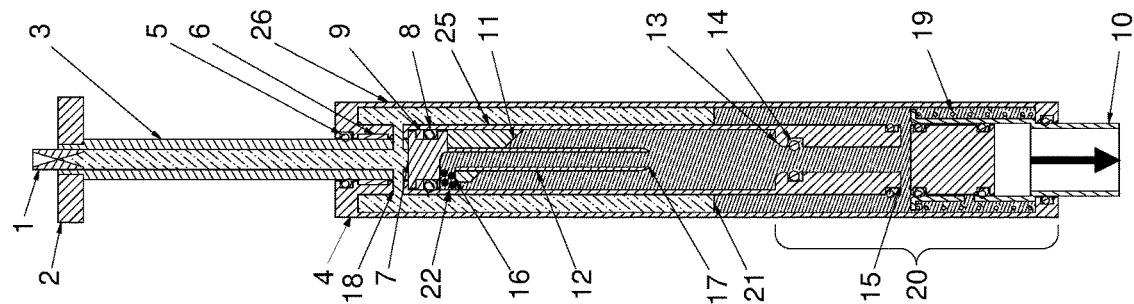
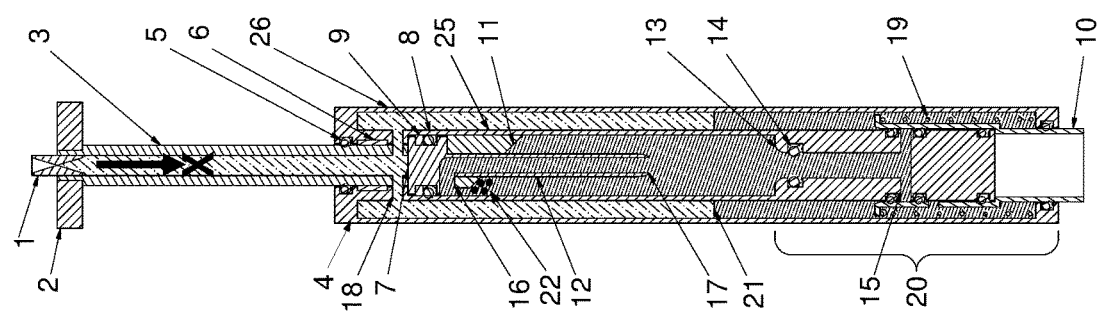
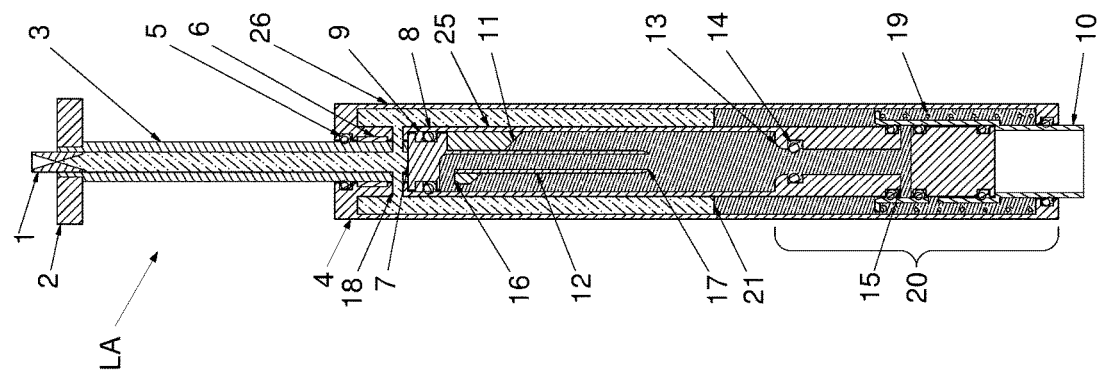

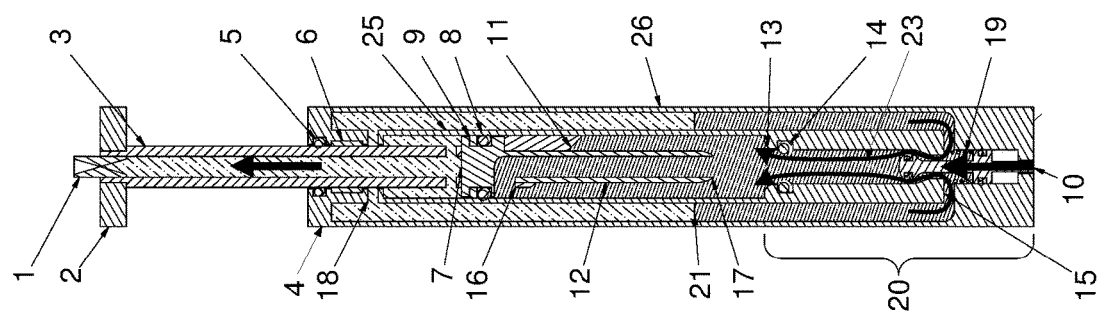
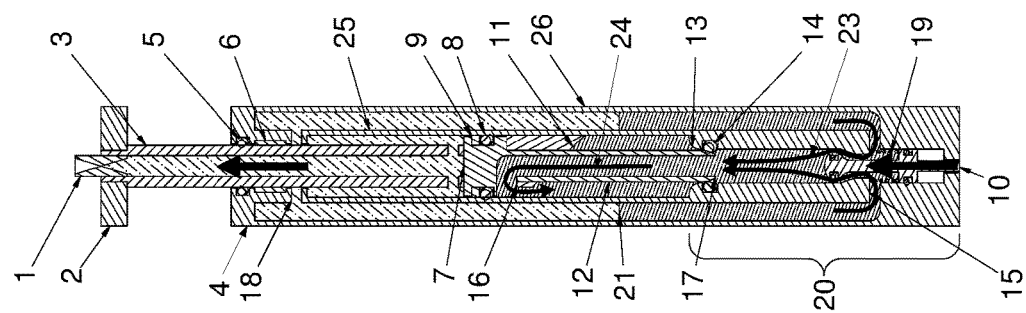
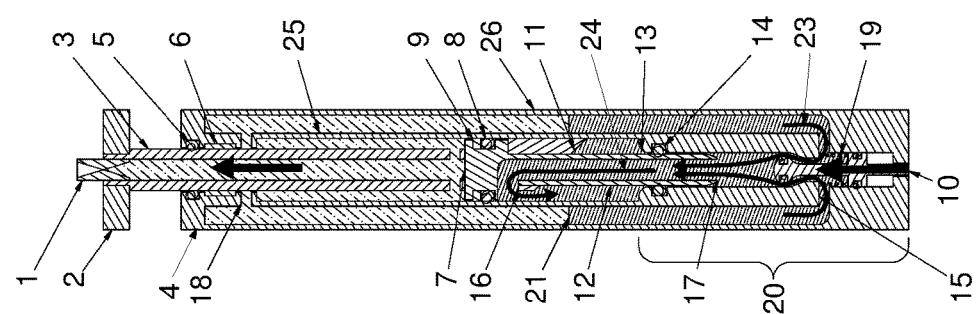
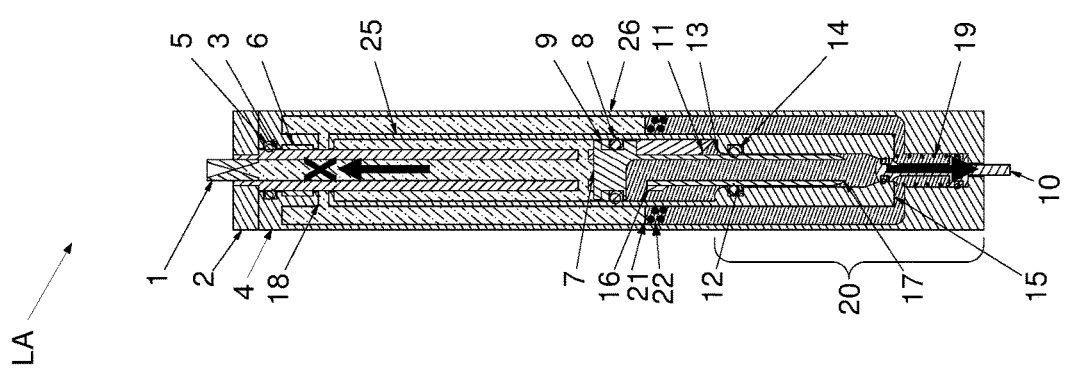

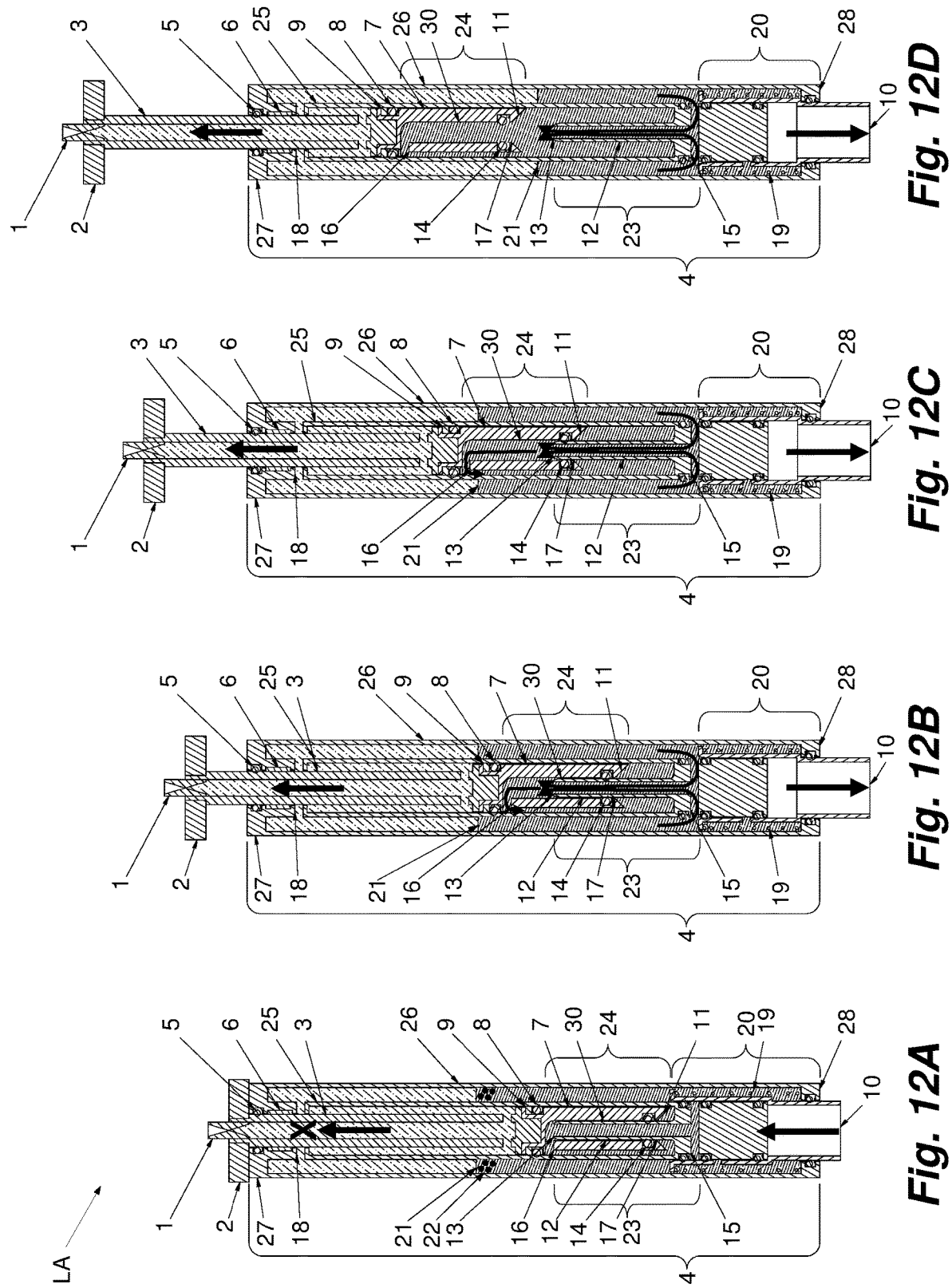

CONFIGURATION 1

CONFIGURATION 2

CONFIGURATION 3

CONFIGURATION 4

CONFIGURATION 5

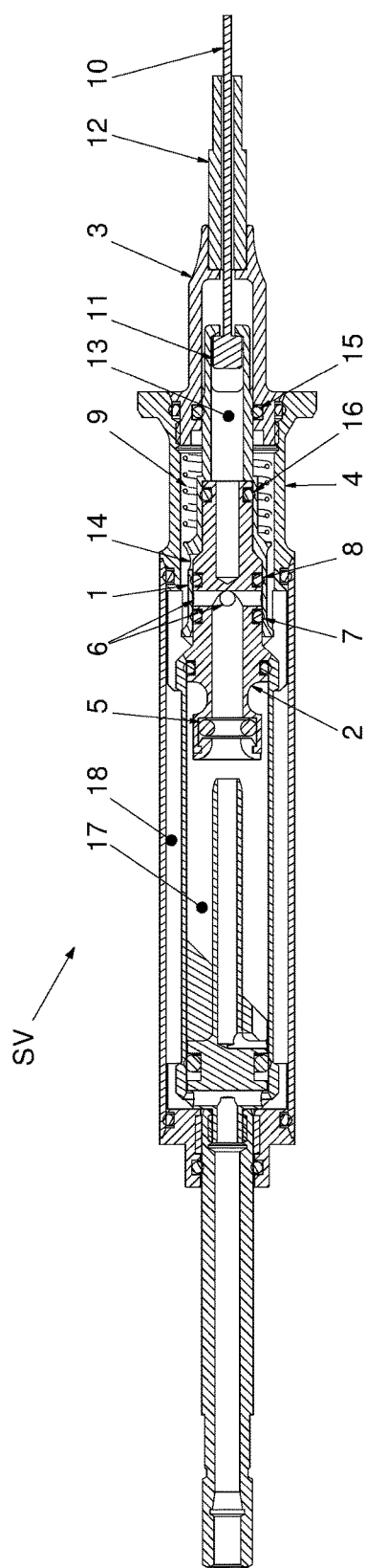
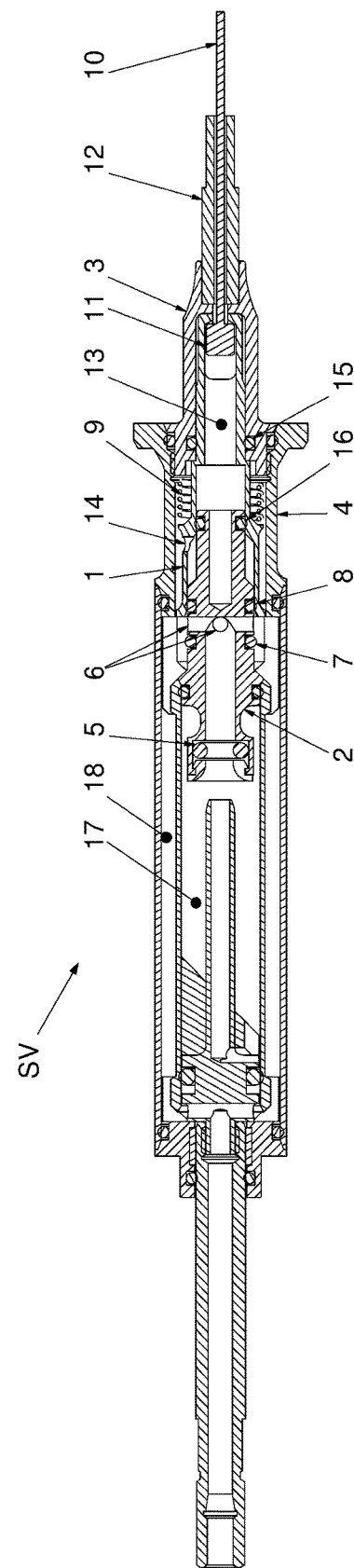
Fig. 16A
Fig. 16B

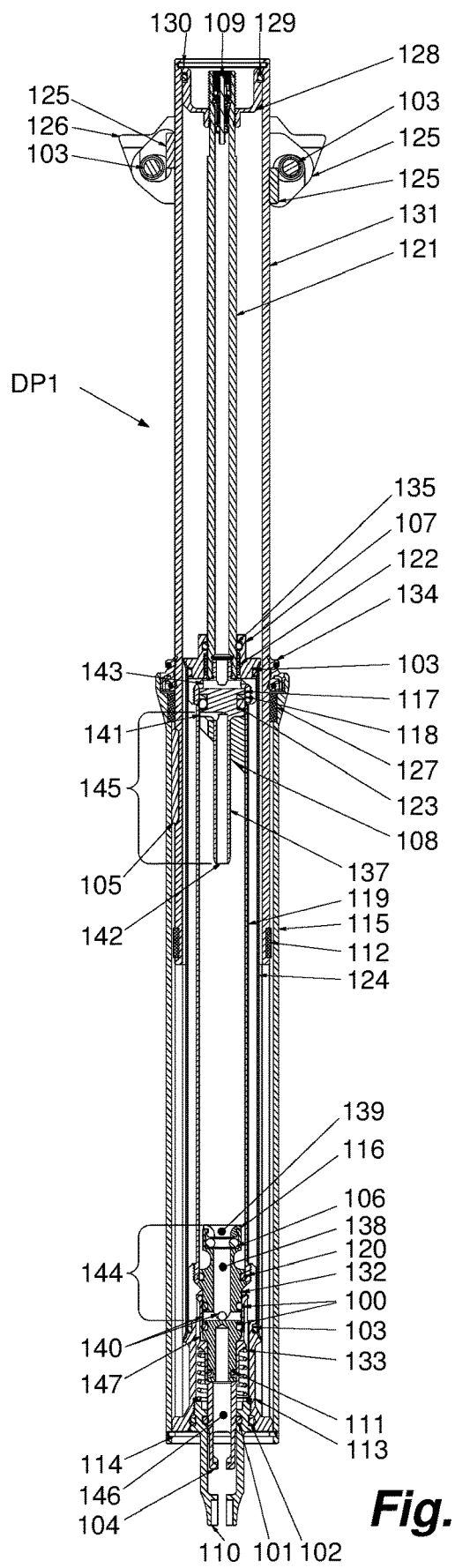
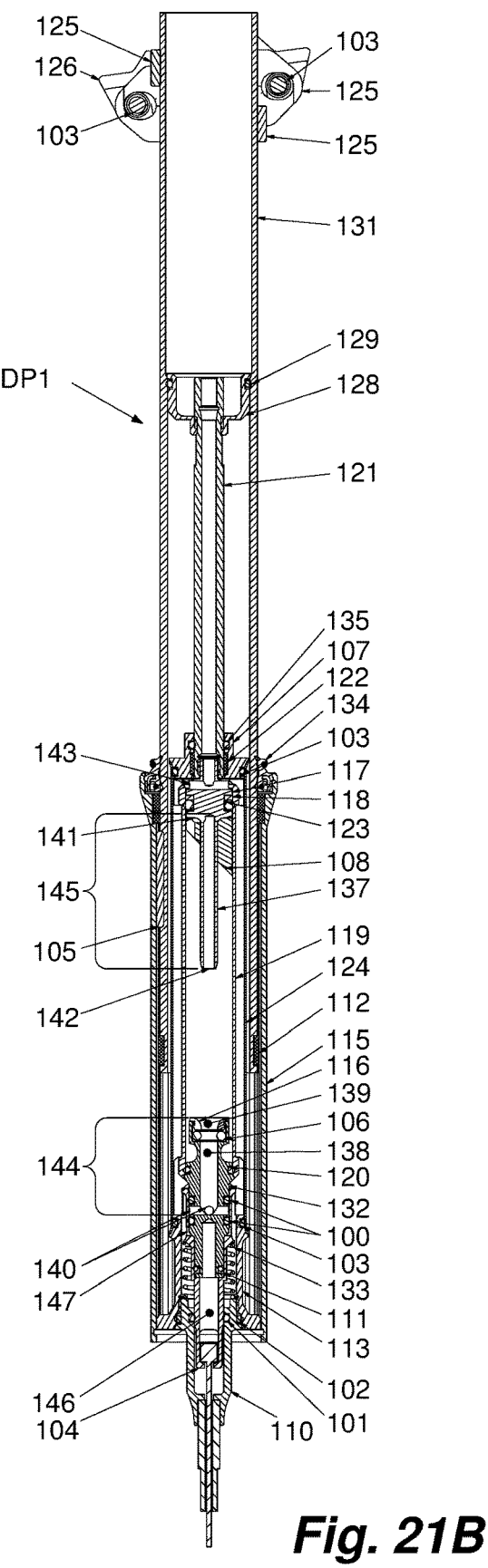
*Fig. 21A*  *Fig. 21B*

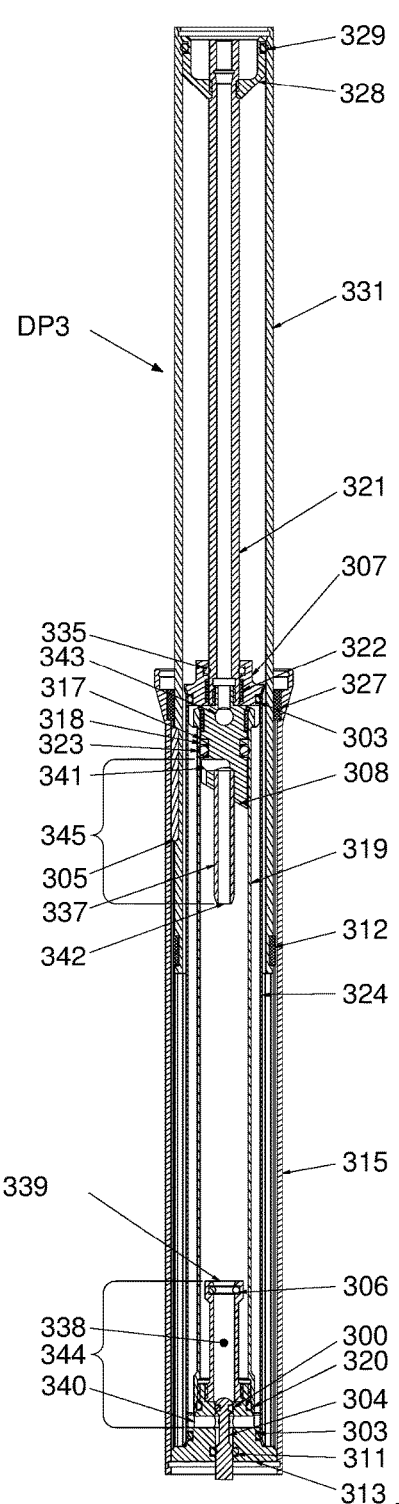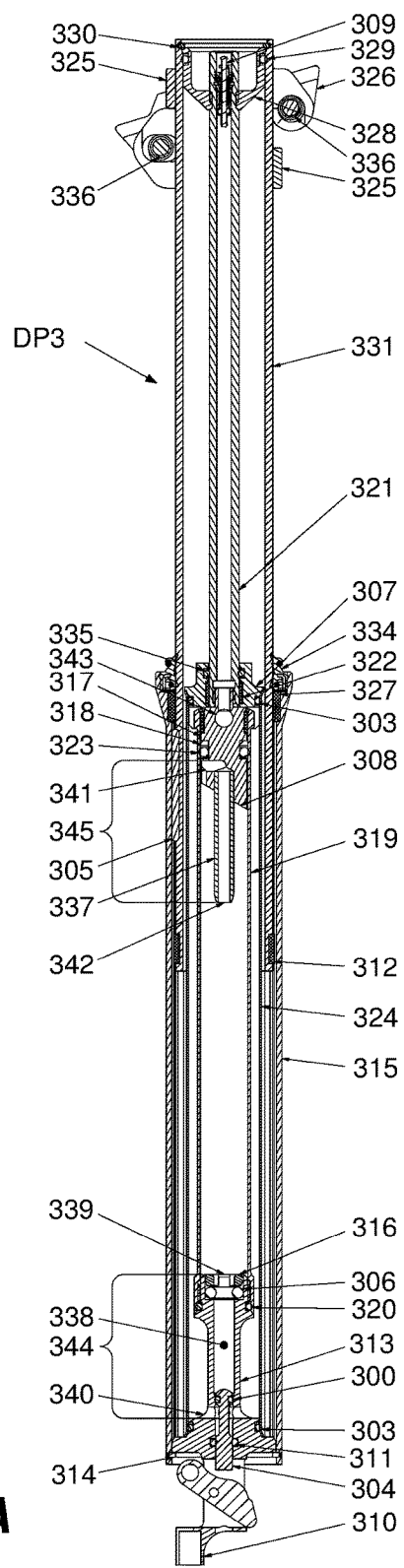
*Fig. 23A*  *Fig. 23B*

LINEAR ACTUATOR SYSTEM

CROSS-REFERENCE TO RELATED APPLICATIONS

This application claims priority under 35 U.S.C. § 119(e) to U.S. Provisional Patent Application Ser. No. 62/651,379 filed on Apr. 2, 2018, and incorporated herein by reference.

TECHNICAL FIELD

This instant specification relates to telescopic linear actuators with self-bleeding hydraulics. This instant specification relates to a balanced, direct-actuation, spool-type flow control valve used in a linear actuator.

BACKGROUND

Pneumo-hydraulic linear actuators rely on gas and liquids to operate. The liquid is generally used to provide an incompressible column of fluid in which to support a load. The gas is generally used to provide a bias force which can be used to automatically extend (or retract) the linear actuator. Most pneumo-hydraulic linear actuators utilize an internal floating piston (IFP) to maintain separation of the gas from the liquid in a reservoir that contains both liquid and gas.

These types of linear actuators suffer when gas unintentionally enters the fluid column. The liquid commonly used in these linear actuators, in itself, can be considered relatively incompressible, however when gas is mixed with the liquid, the fluid becomes compressible. This result is usually undesirable, especially when the linear actuator's purpose is to securely maintain position. Gas can enter the fluid column by a variety of means; most commonly by leaking seals either in the IFP or in the piston seal. Leaking seals is virtually unavoidable, especially with wear of the system over time. Therefore, the fluid column should eventually be purged of the gas. This is typically done by disassembly of the system, manually bleeding the gas through a bleed port, or manually opening a secondary valve specific to bleeding gas from the column. Because of this, many manufacturers seek to minimize leakage of gas into the fluid column in order to extend the service life. However, eventually the system will need to be bled. This type of service is disruptive, causes downtime of equipment, and can be expensive.

Most hydraulic seatposts utilize a poppet valve. Poppet valves are affected by the pressure acting upon them. System pressures can also act upon the poppet to move them. If a poppet is configured to open into (to the inside) a high-pressure cylinder, the pressure of the cylinder will help hold the valve closed. If the pressure increases significantly, the force required to open the valve also increases. In some cases, this force can become too high and the valve cannot be easily opened. A rider applying body weight to a seatpost is enough to make a poppet valve difficult to open. Many times, the rider first removes his/her weight from the saddle and then actuates it. This extra step can disrupt the riding position and balance of the bike.

However, if the poppet is configured to open away (to the outside) from the cylinder, the pressure in the cylinder will act upon the poppet to open it. To keep the valve closed in this configuration a spring bias is used. The spring should be strong enough to overcome the force applied by the pressure inside the cylinder. However, if this force is great enough, the ability to actuate the valve by hand becomes too difficult.

In either case, the direct effect of the pressure on the valve changes the actuation force required to operate the actuator. This variable force is undesirable.

Also, most hydraulic seatposts up until this point have used a "push" force to open the valve. For seatposts that are cable controlled, this force is converted to a pull motion. A variety of means to achieve this have been developed by various manufacturers, but most commonly a lever or cam device to convert pull to push is invoked. Other solutions may utilize hydraulic means of converting pull to push.

SUMMARY

In general, this document describes telescopic linear actuators. Namely, linear actuators that automatically and continuously bleeds itself—maintaining an incompressible fluid column and extending the service life of the linear actuator.

The systems and techniques described here may provide one or more of the following advantages. First, the system provides a way for gas to be automatically purged from the fluid column. Second, the system eliminates the need for an IFP. Third, the purge architecture has no extra moving parts. Fourth, the simple design provides for significant weight savings. Fifth, the purge system can be incorporated into various linear actuator architectures.

In general, this document describes a balanced (e.g., remains substantially unaffected by pressure changes in the actuator), direct-actuation, inverse spool-type flow control valve. An inverse spool-type control valve includes an outside that moves relative to an inside, as described herein the outside may generally be referred to as an "actuator" and the inside may generally be referred to as a "core." In a non-inverse spool-type control valve the core/spool (inside component) is what moves.

The systems and techniques described here may provide one or more of the following advantages. First, low actuation force. Second, pressure balanced valve with little to no pressure bias on the actuator. Third, direct pull actuation. Fourth, simple control cable attachment/detachment. Fifth, flow modulation. Sixth, alternate unbalanced configuration that produces a bias force in place of the spring.

The details of one or more implementations are set forth in the accompanying drawings and the description below. Other features and advantages will be apparent from the description and drawings

BRIEF DESCRIPTION OF THE DRAWINGS

FIGS. 2A, 2B, 2C, 2D illustrate section views of examples of four embodiments of a linear actuator in accordance with the present disclosure, respectively, with the linear actuators fully extended, locked (gas and liquid shown).

FIGS. 3A, 3B, 3C, 3D illustrate section views of the examples of the four embodiments of the linear actuators of FIGS. 2A, 2B, 2C, 2D, respectively, with the linear actuators fully compressed, locked (gas and liquid shown).

FIGS. 5A, 5B, 5C, 5D, 5E, 5F, 5G illustrate an example of a first embodiment of a linear actuator in accordance with the present disclosure illustrating compression flow with gas purge.

FIGS. 6A, 6B, 6C, 6D, 6E, 6F illustrate an example of the first embodiment of a linear actuator in accordance with the present disclosure illustrating extension flow after gas purge.

FIGS. 7A, 7B, 7C, 7D, 7E, 7F, 7G illustrate an example of a second embodiment of a linear actuator in accordance with the present disclosure illustrating compression flow with gas purge.

FIGS. 8A, 8B, 8C, 8D, 8E, 8F illustrate an example of the second embodiment of a linear actuator in accordance with the present disclosure illustrating extension flow after gas purge.

FIGS. 9A, 9B, 9C, 9D, 9E, 9F, 9G illustrate an example of a third embodiment of a linear actuator in accordance with the present disclosure illustrating compression flow with gas purge.

FIGS. 10A, 10B, 10C, 10D, 10E, 10F illustrate an example of the third embodiment of a linear actuator in accordance with the present disclosure illustrating extension flow after gas purge.

FIGS. 11A, 11B, 11C, 11D, 11E, 11F, 11G illustrate an example of a fourth embodiment of a linear actuator in accordance with the present disclosure illustrating compression flow with gas purge.

FIGS. 12A, 12B, 12C, 12D, 12E, 12F illustrate an example of the fourth embodiment of a linear actuator in accordance with the present disclosure illustrating extension flow after gas purge.

Figure 1:
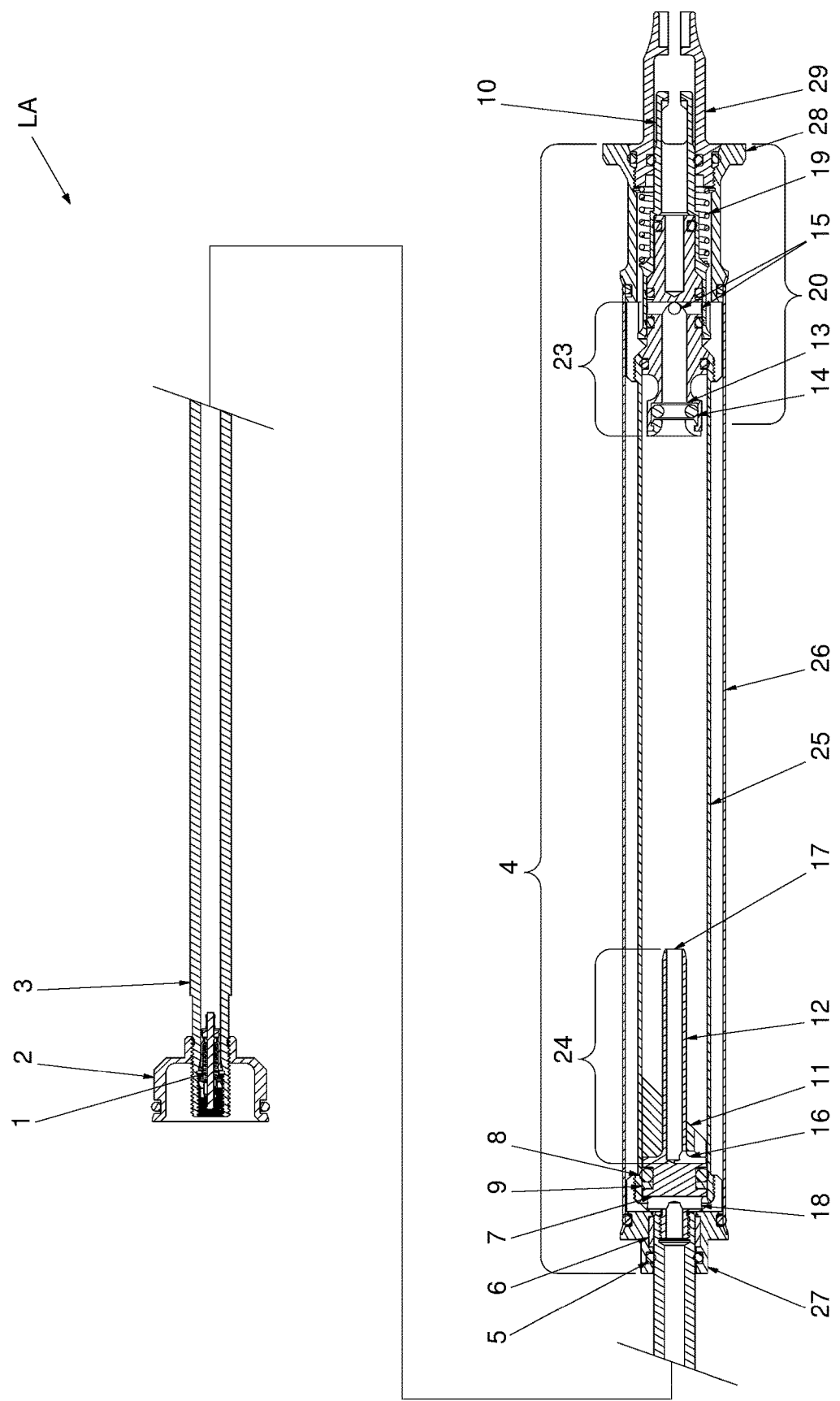
FIG. 1 illustrates a section view of an example of a linear actuator in accordance with the present disclosure including a detailed component overview, with the linear actuator fully extended, locked.
Figure 4A:
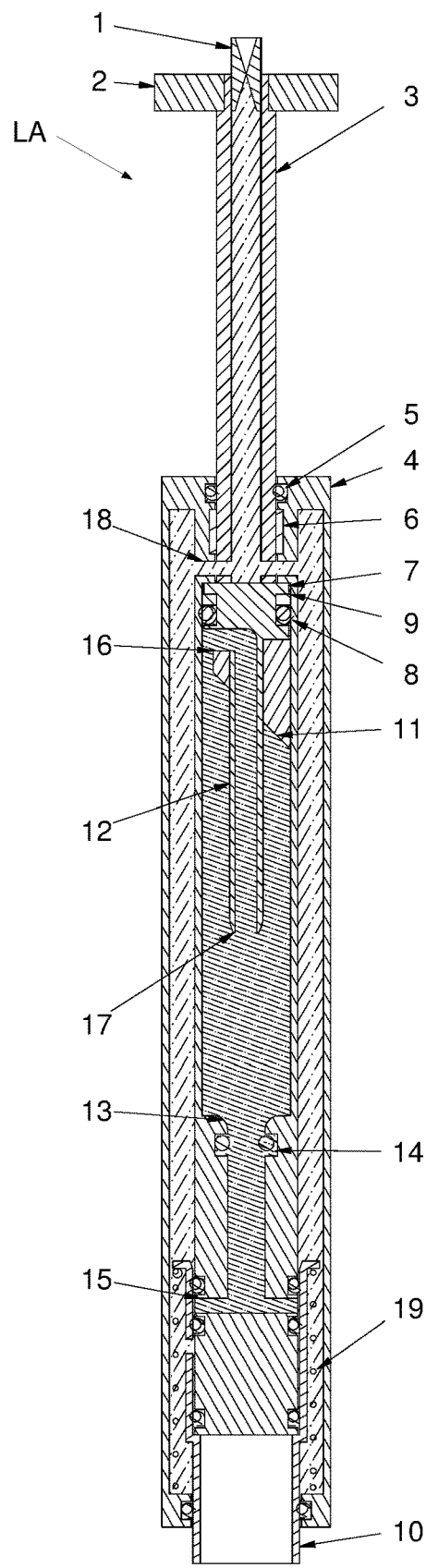
FIGS. 4A, 4B illustrate an example of a linear actuator in accordance with the present disclosure including illustrations of Volume A and Volume B using the first embodiment of the linear actuator of FIGS. 2A, 3A, with FIG. 4A illustrating the linear actuator fully extended, and FIG. 4B illustrating the linear actuator fully retracted.
Figure 4B:
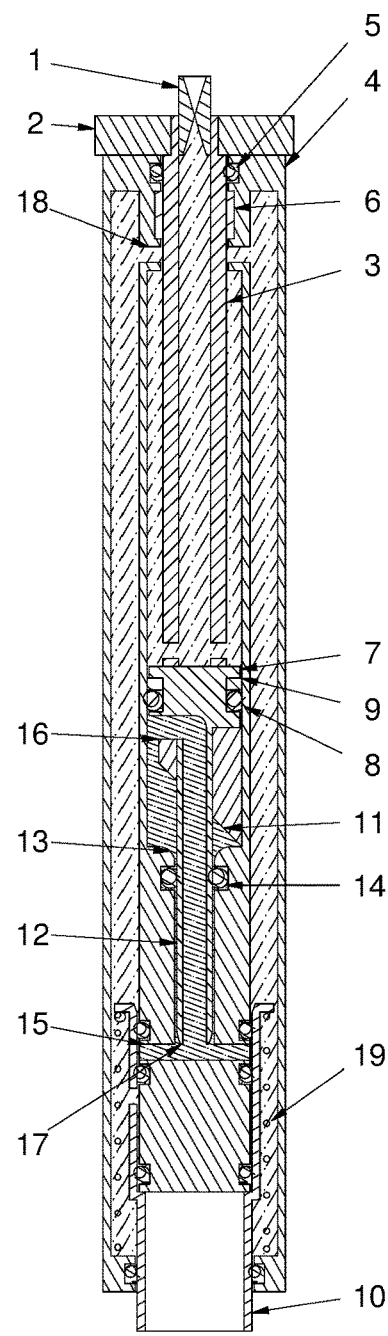
Figure 5E:
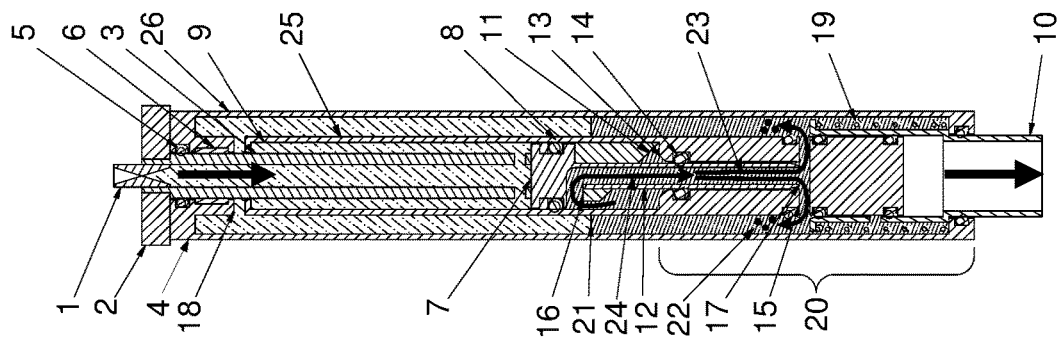
Figure 5F:
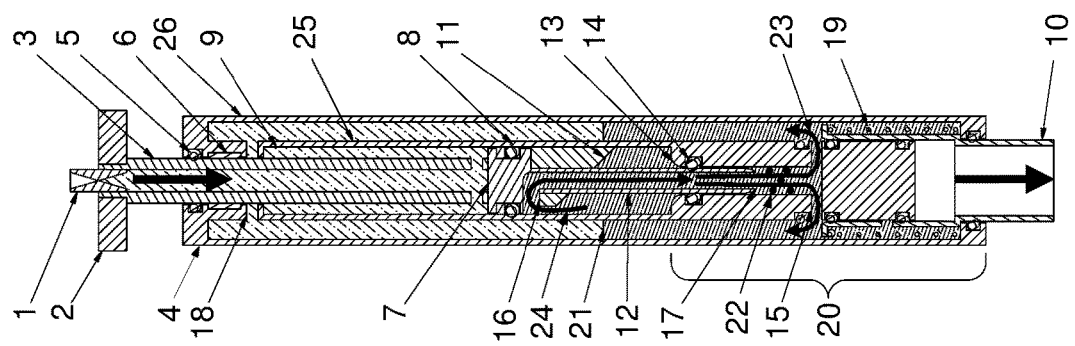
Figure 5G:
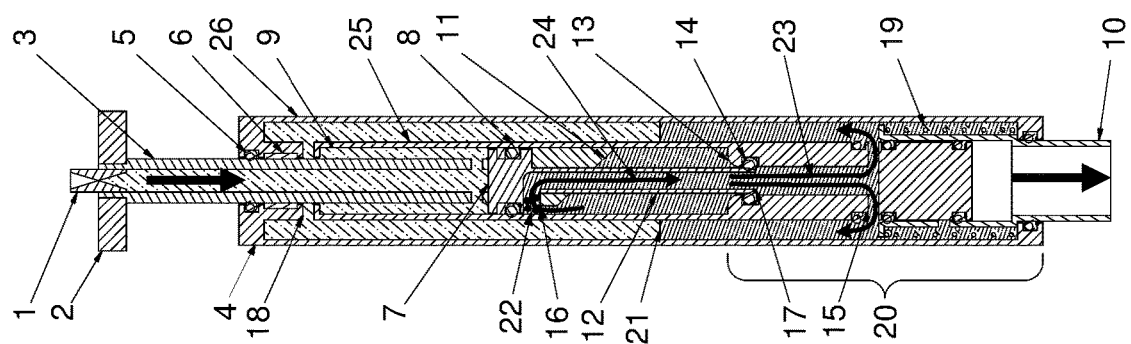
Figure 6D:
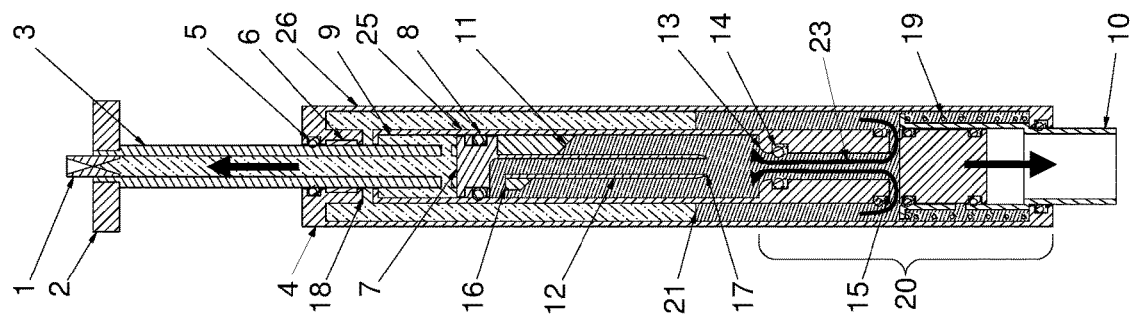
Figure 6C:
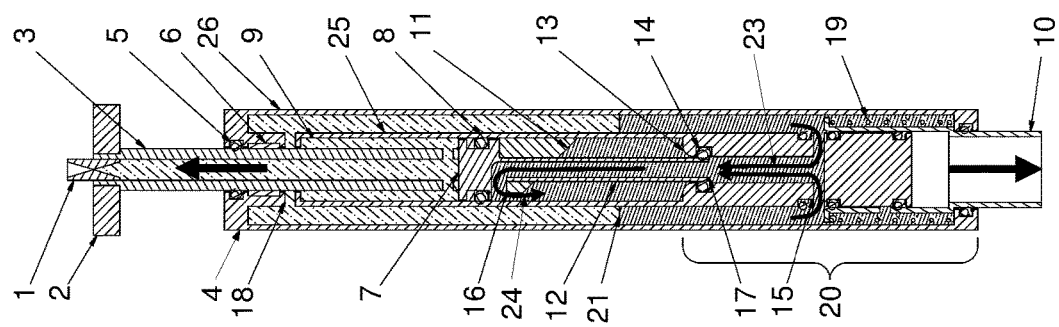
Figure 6B:
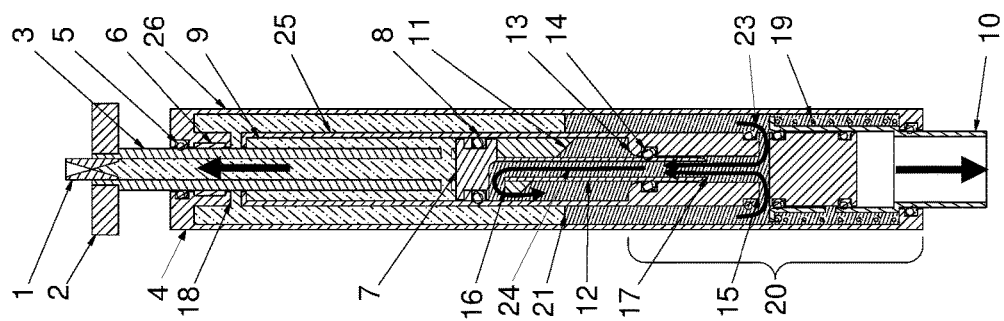
Figure 6A:
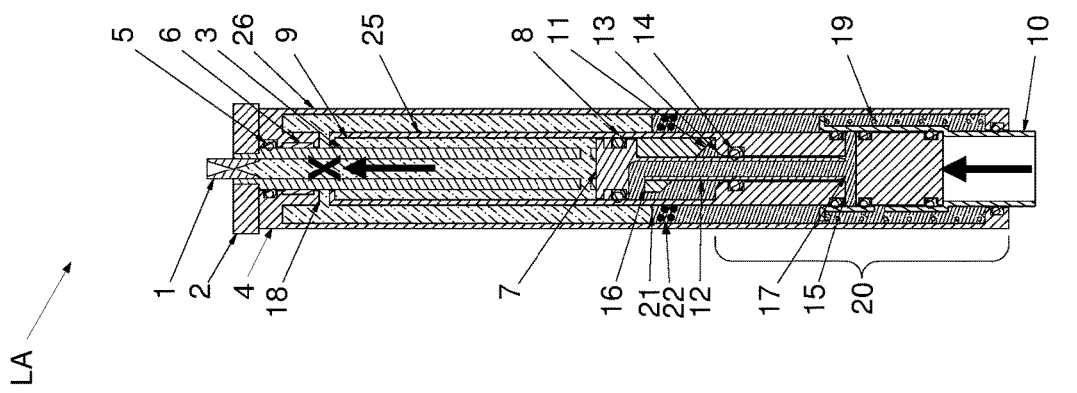
Figure 6E:
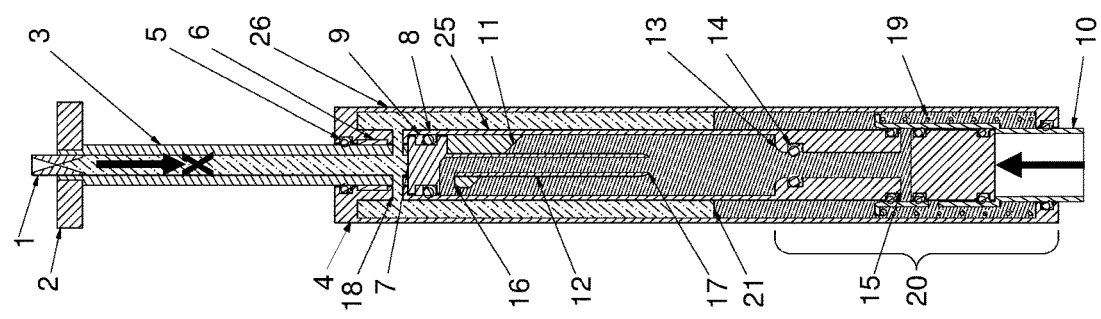
Figure 6F:
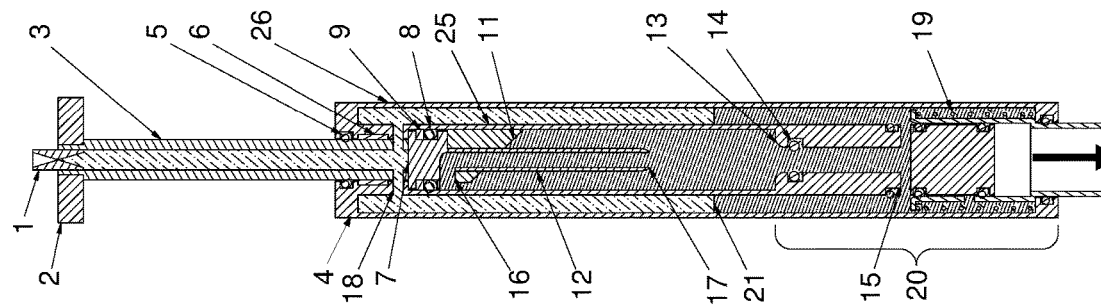
Figure 7A:
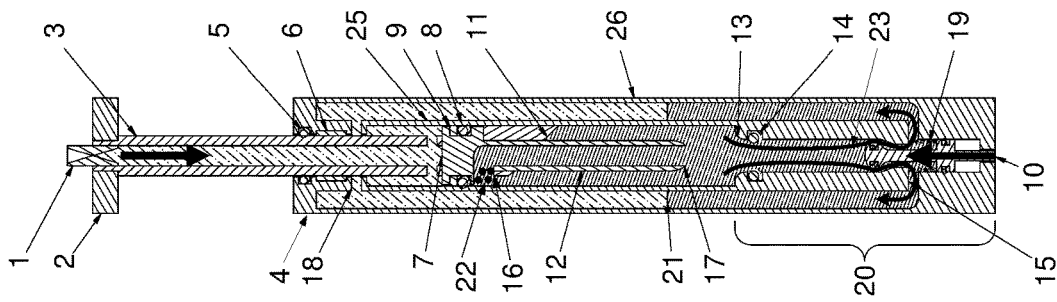
Figure 7B:
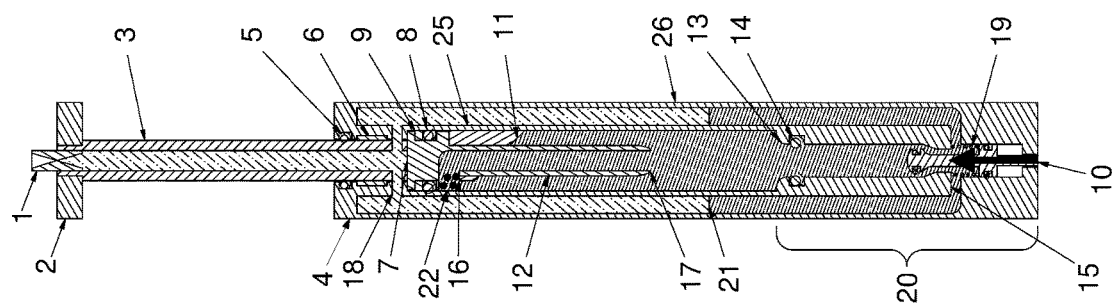
Figure 7C:
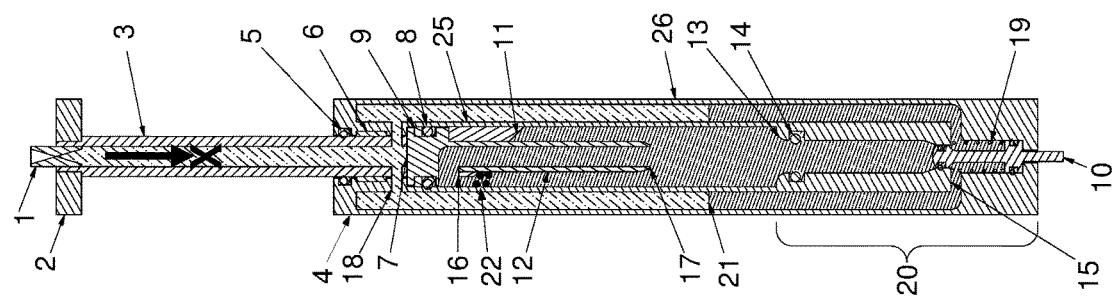
Figure 7D:
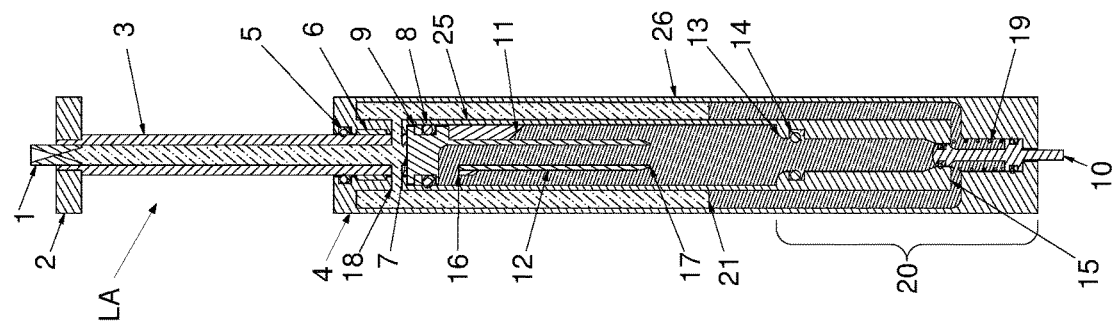
Figure 7E:
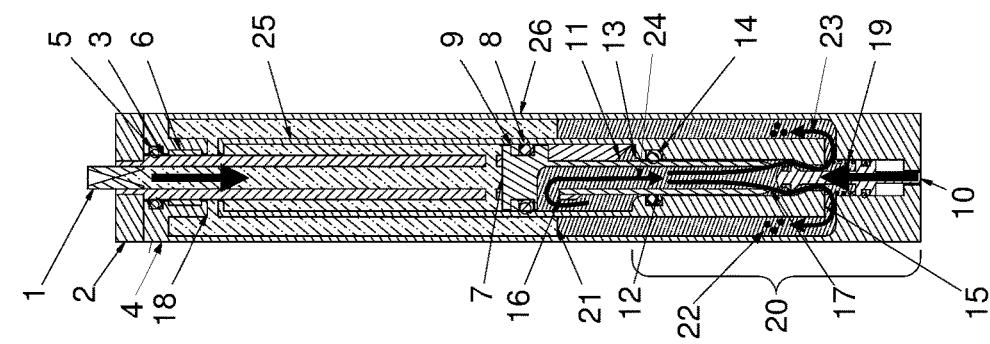
Figure 7F:
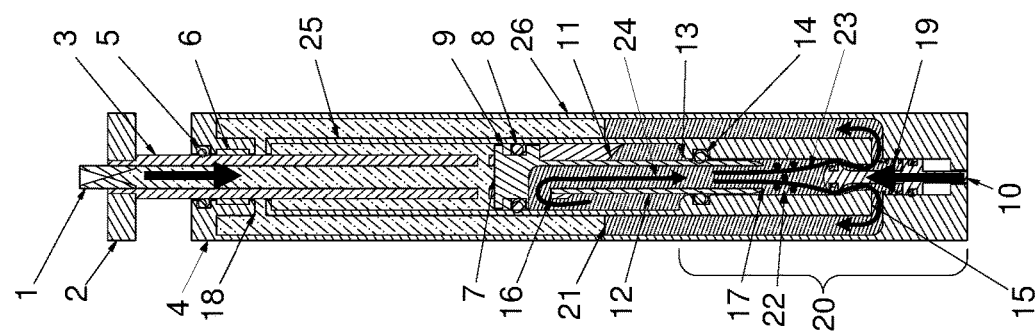
Figure 7G:
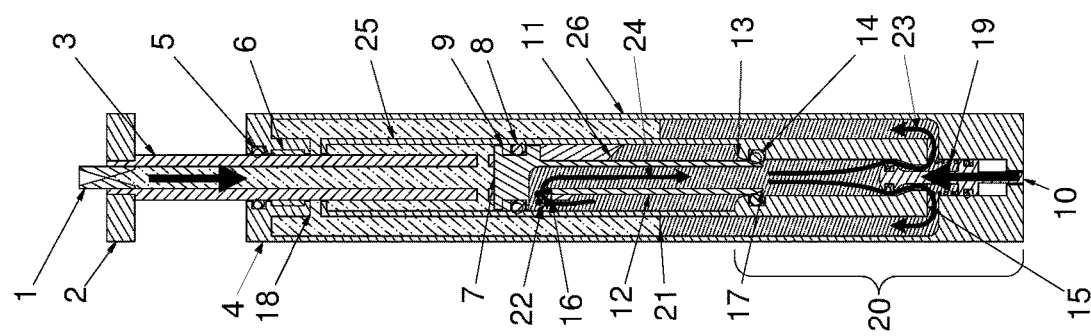
Figure 8E:
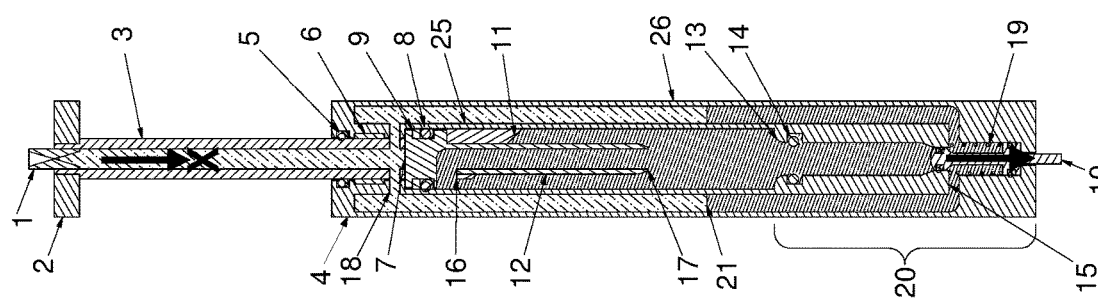
Figure 8F:
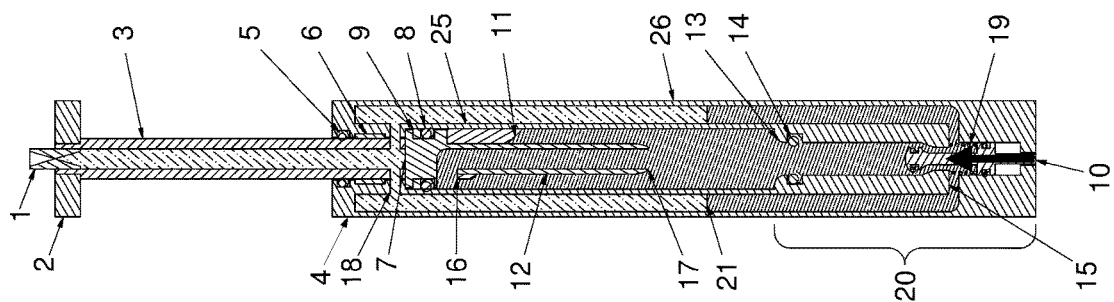
Figure 9D:
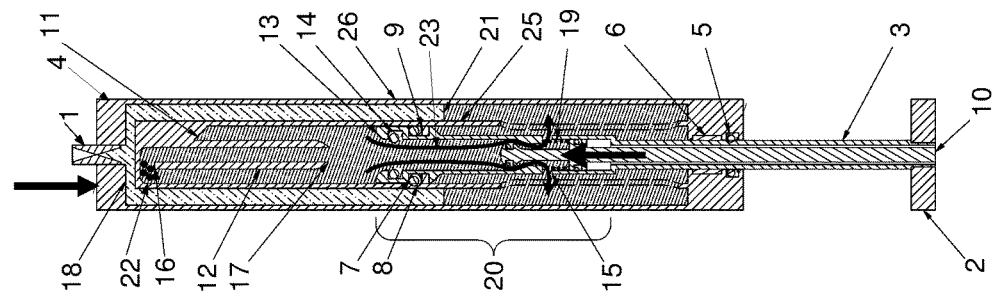
Figure 9C:
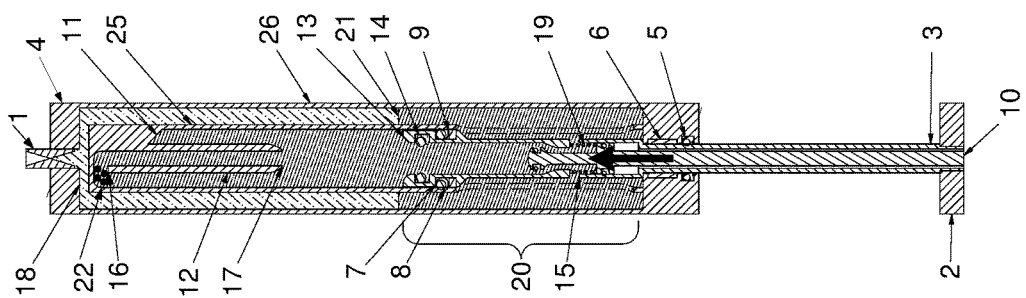
Figure 9B:
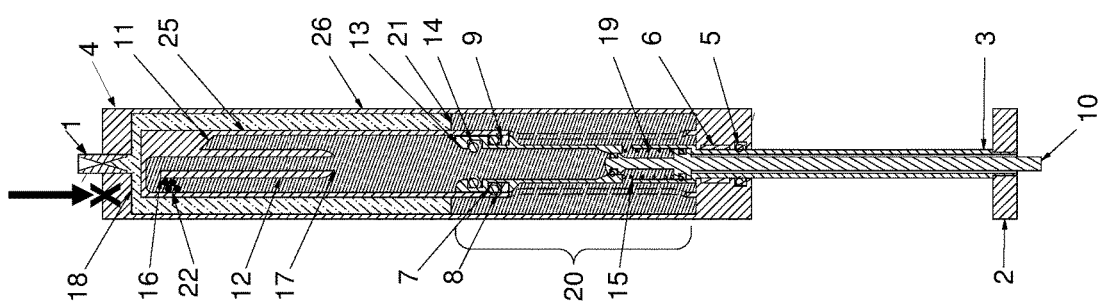
Figure 9A:
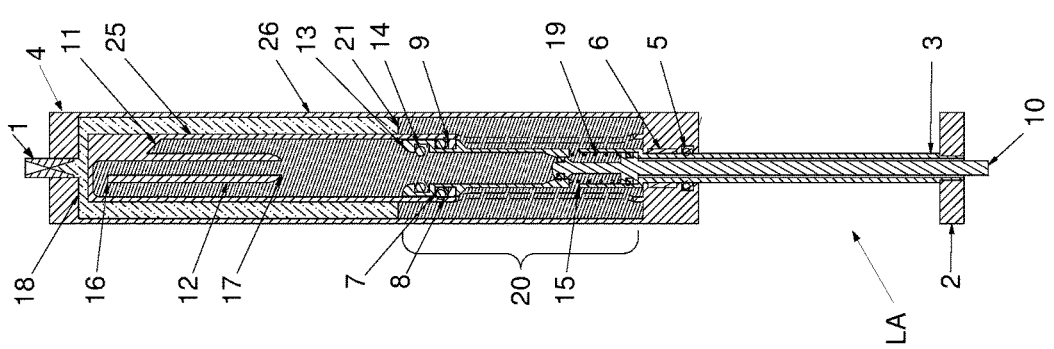
Figure 9E:
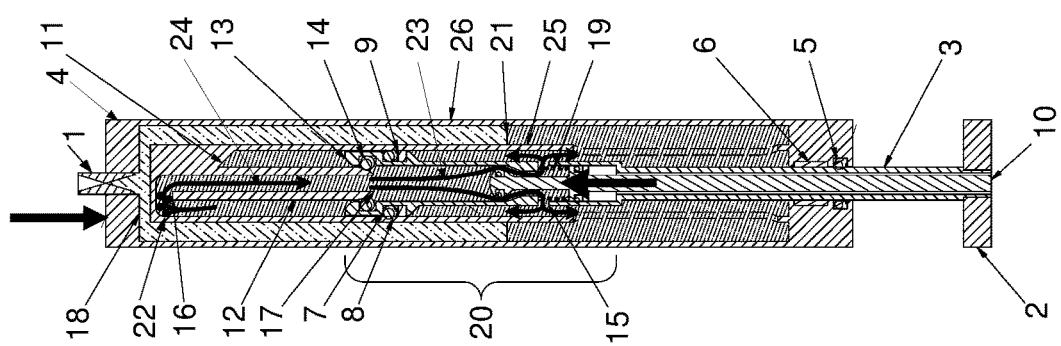
Figure 9F:
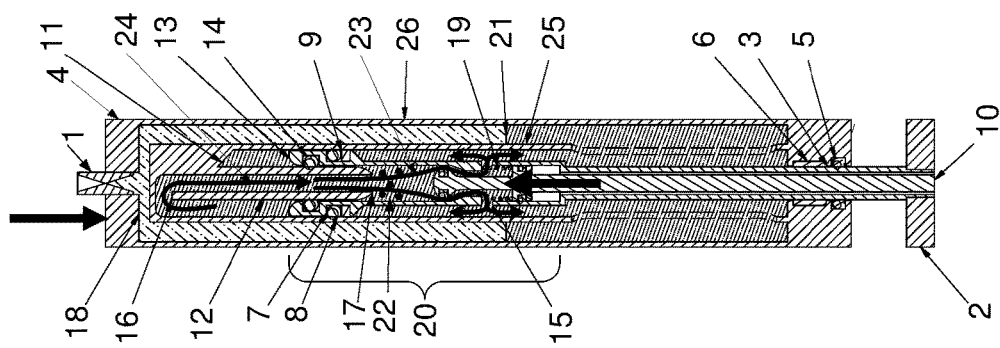
Figure 9G:
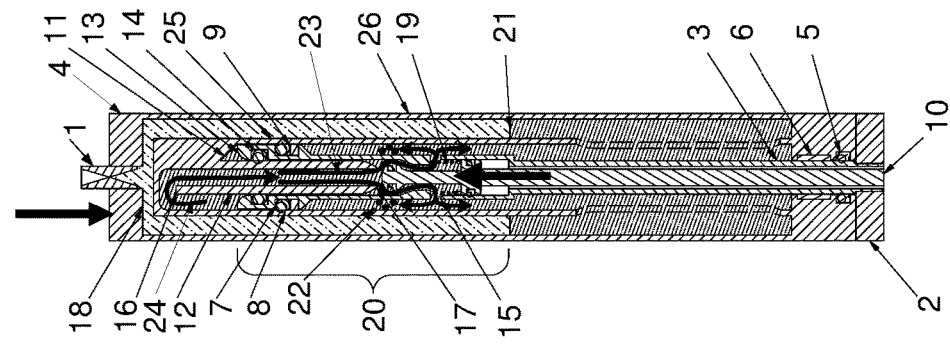
Figure 10A:
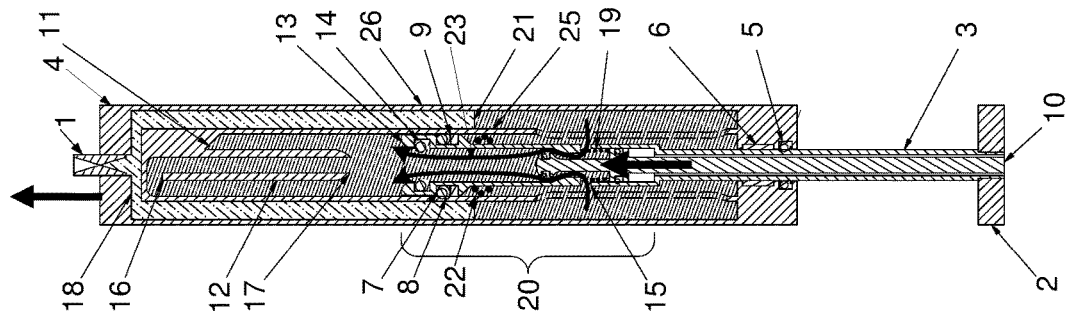
Figure 10B:
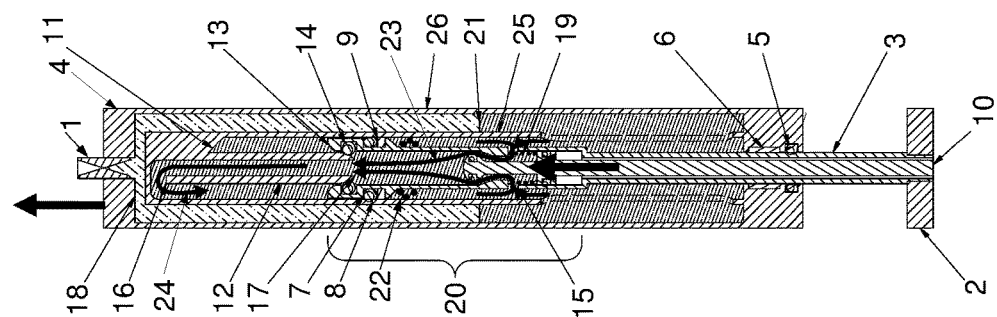
Figure 10C:
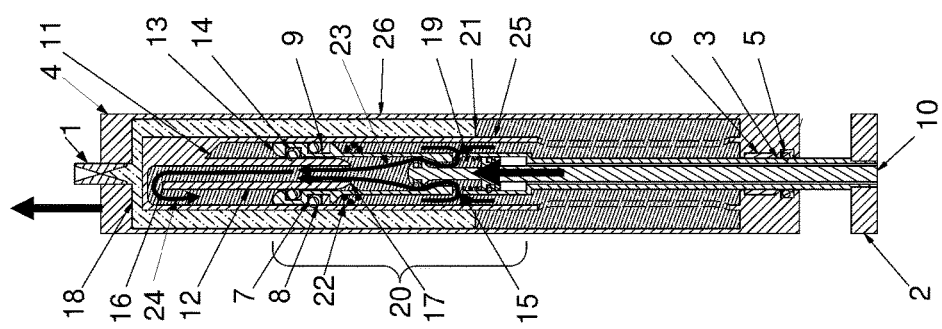
Figure 10D:
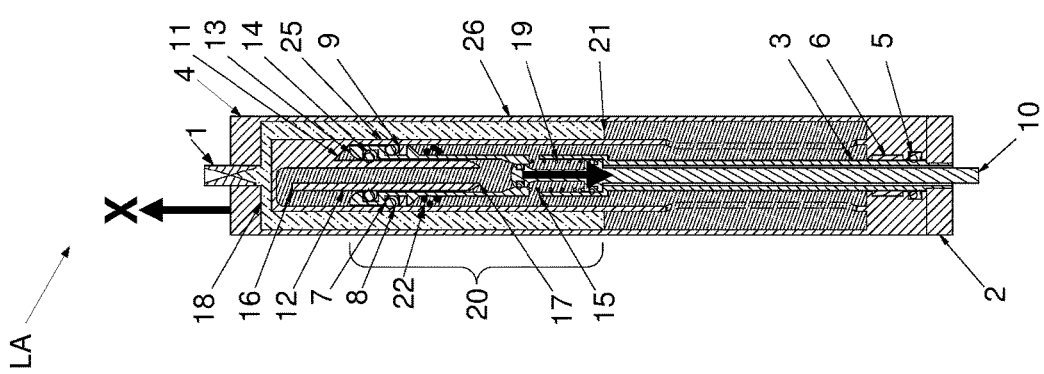
Figure 10E:
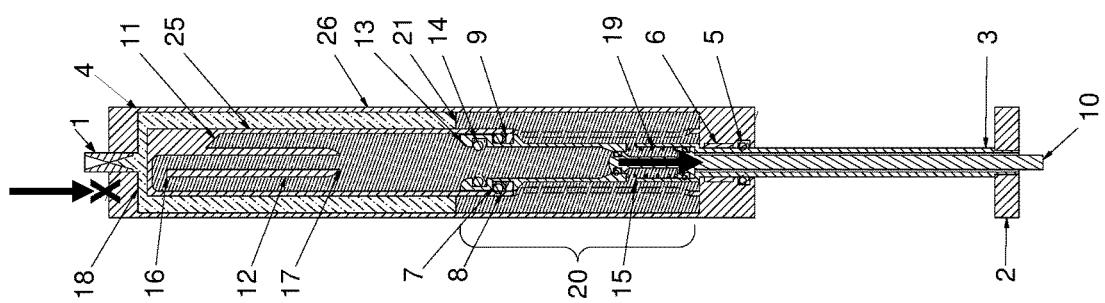
Figure 10F:
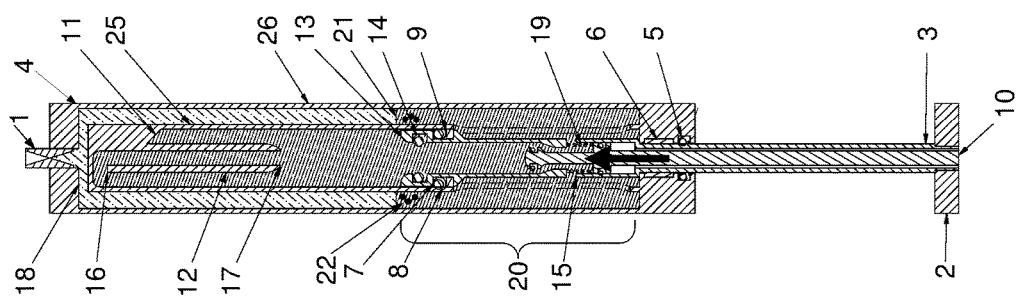
Figure 11A:
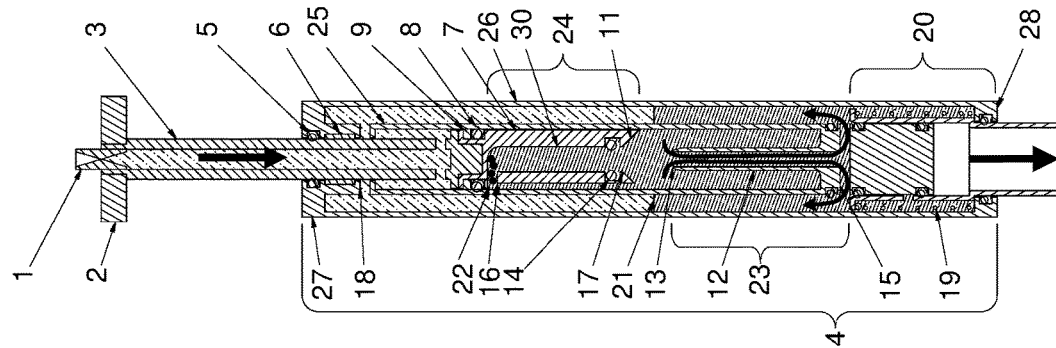
Figure 11B:
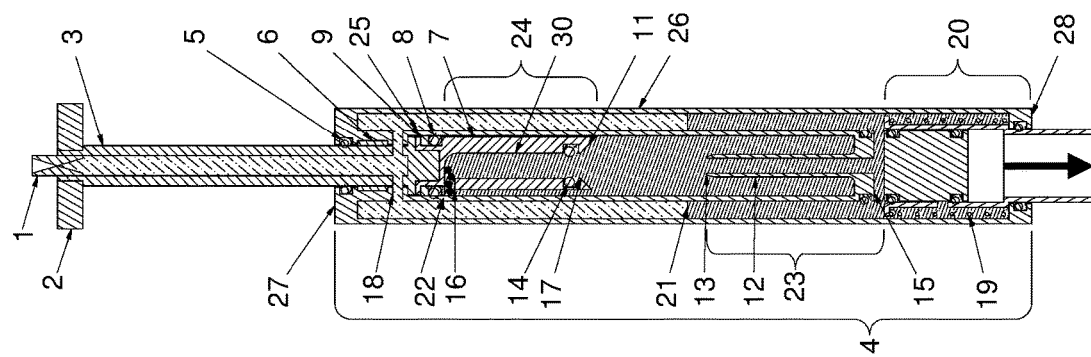
Figure 11C:
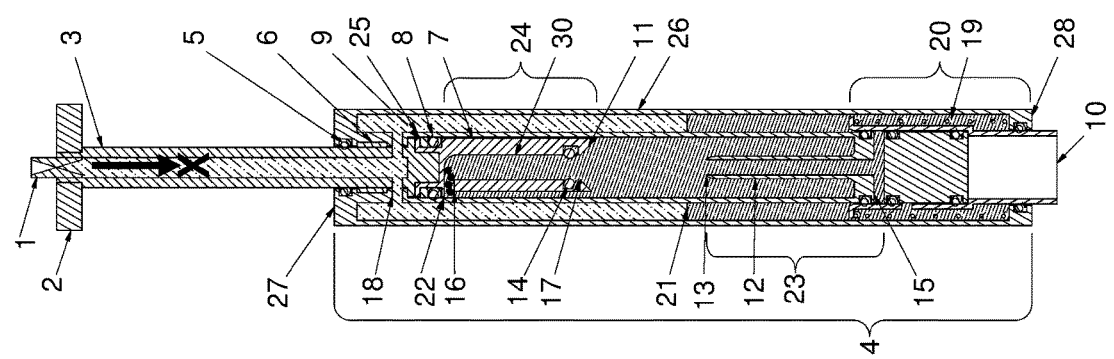
Figure 11D:
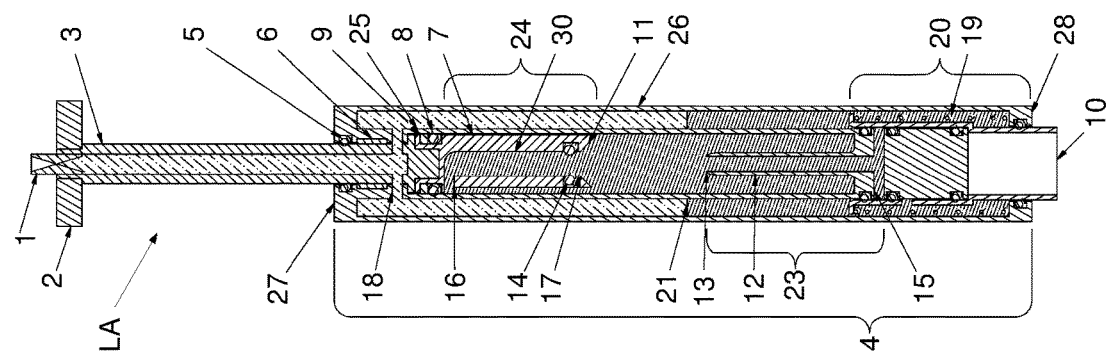
Figure 11E:
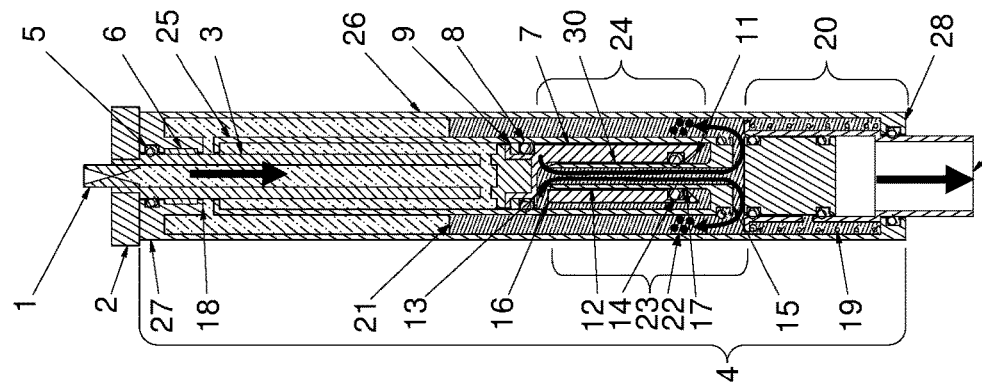
Figure 11F:
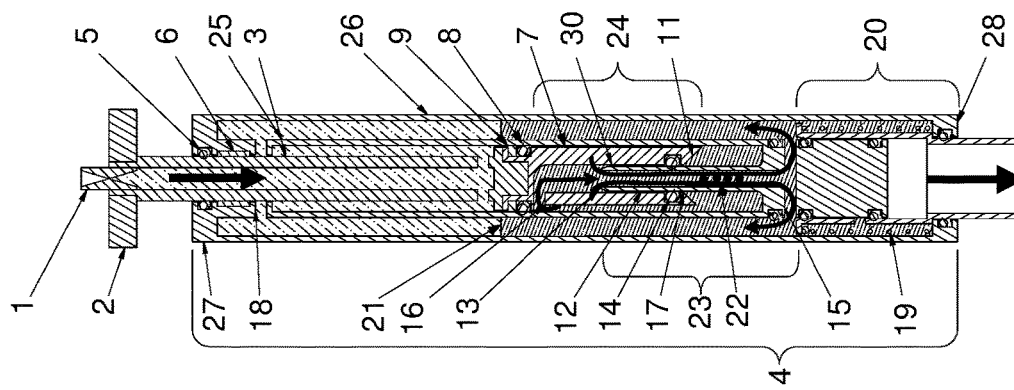
Figure 11G:
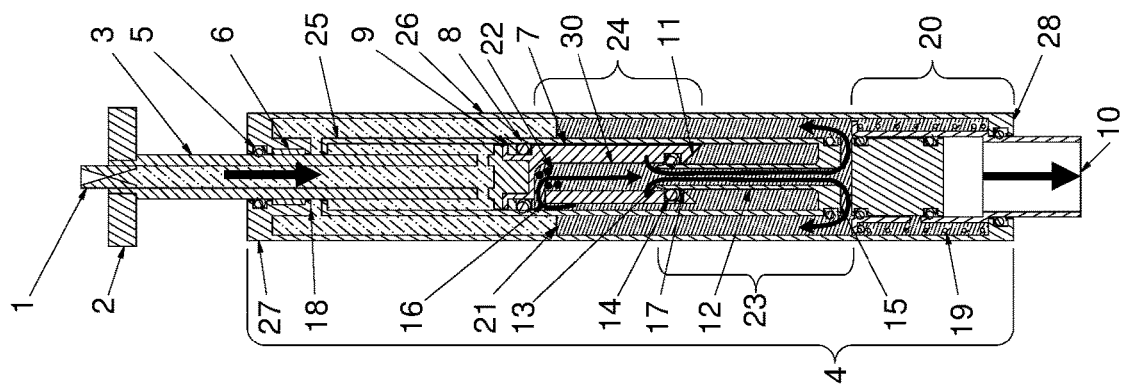
Figure 12E:
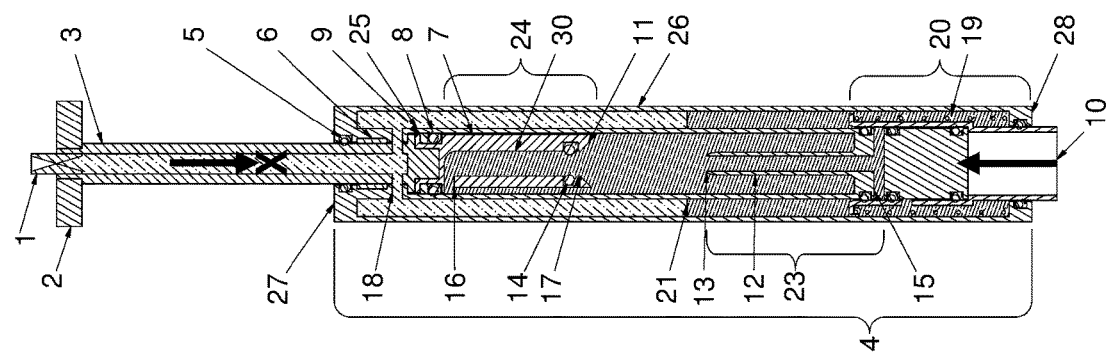
Figure 12F:
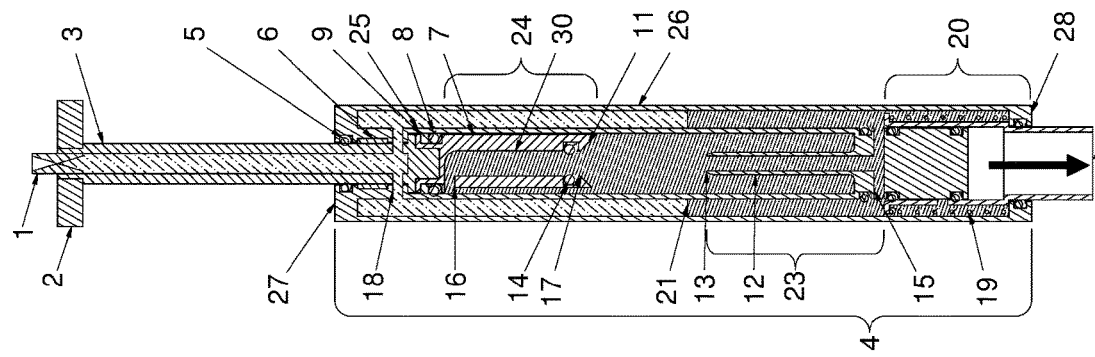
Figure 13A:
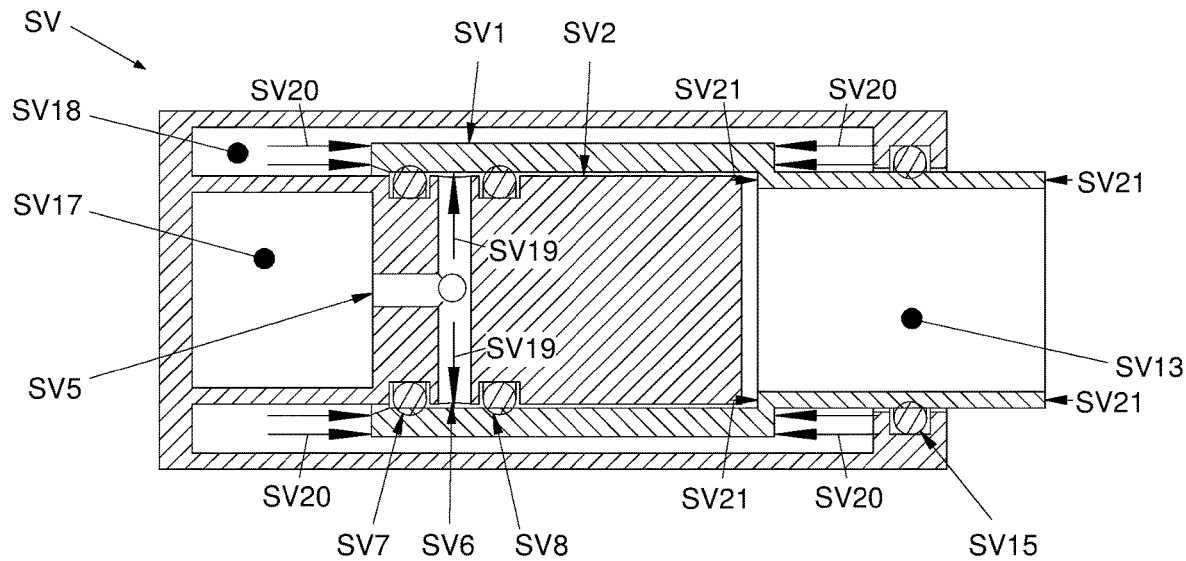
Figure 13B:
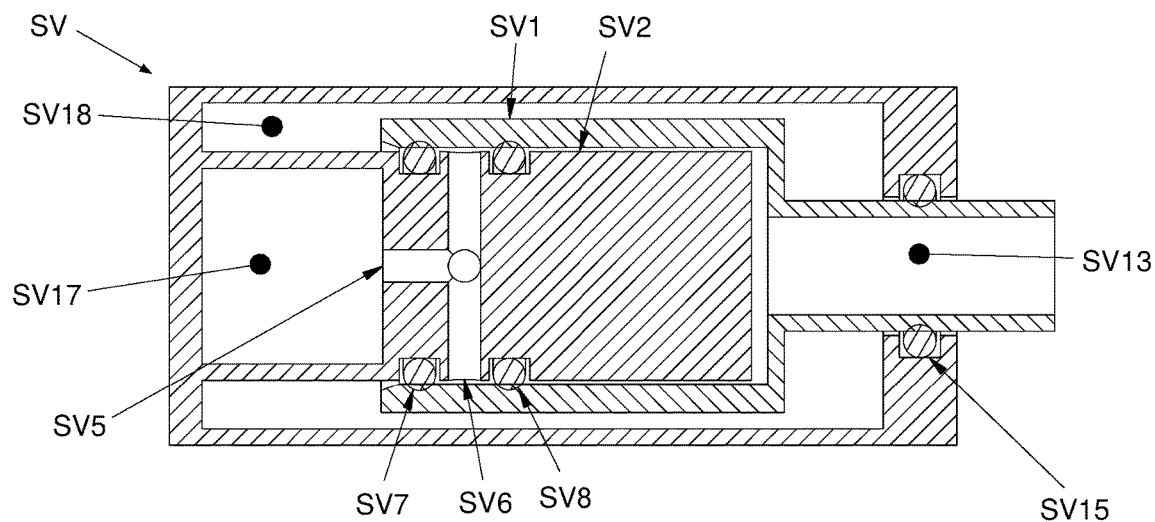
Figure 13C:
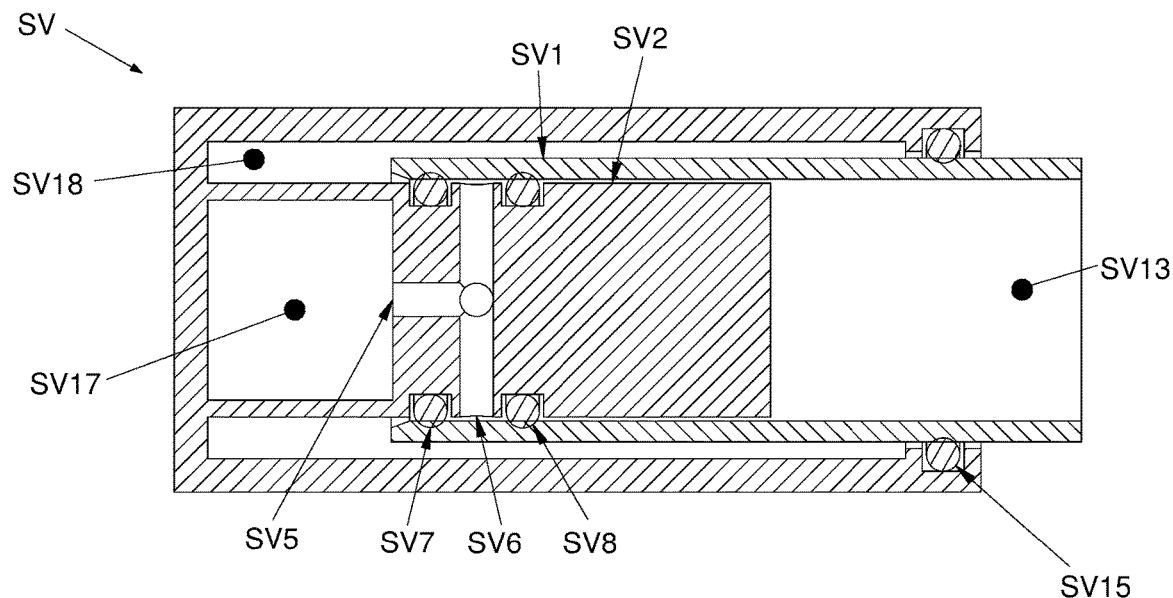
Figure 13D:
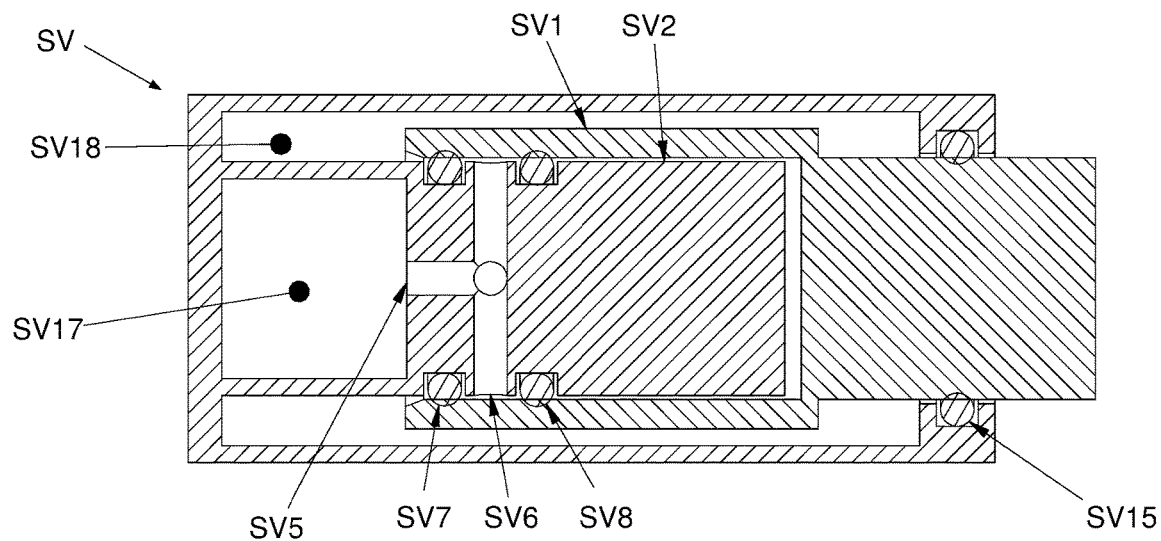
Figure 13E:
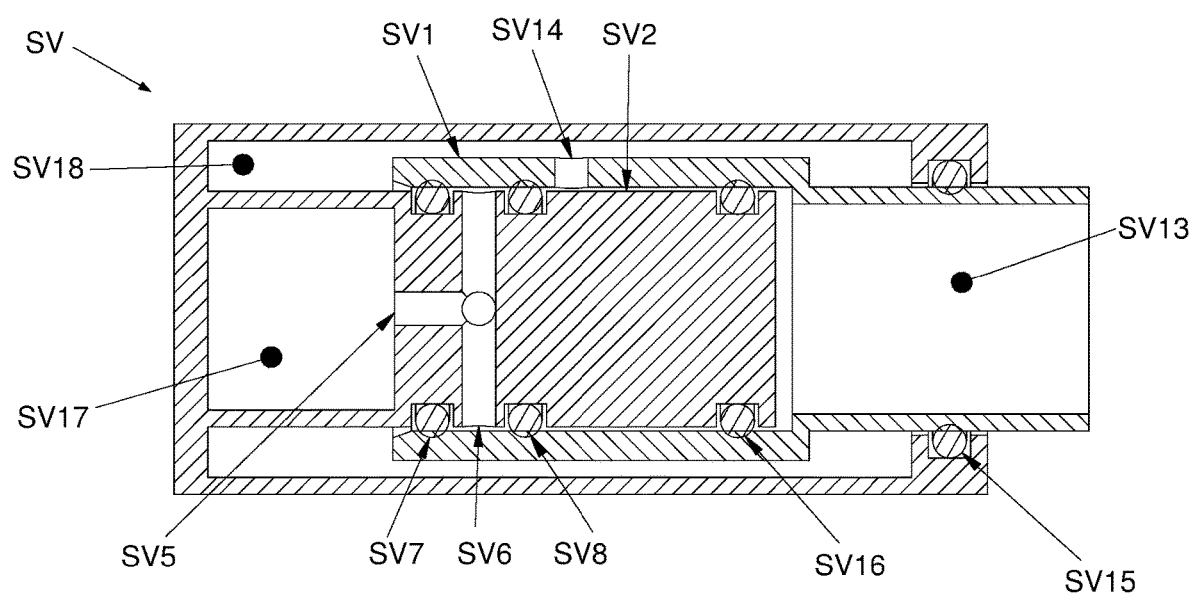

FIGS. 13A, 13B, 13C, 13D, 13E illustrate section views of examples of five configurations of a spool valve in accordance with the present disclosure, with the configuration of FIG. 13A (Configuration 1) being balanced, the configuration of FIG. 13B (Configuration 2) being unbalanced with inward bias, the configuration of FIG. 13C (Configuration 3) being unbalanced with outward bias, the configuration of FIG. 13D (Configuration 4) being unbalanced with inward bias, and the configuration of FIG. 13E (Configuration 5) being balanced with seal redundancy.

Figure 14:
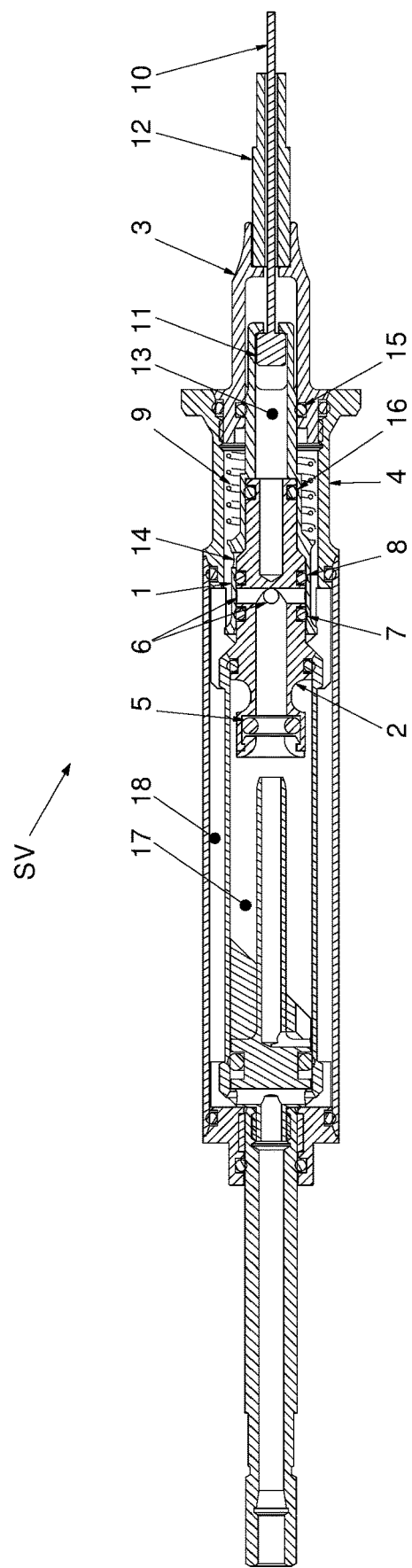

FIG. 14 illustrates an example of a balanced, direct-pull, inverse spool valve in accordance with the present disclosure—in situ (installed in a pneumo-hydraulic linear actuator).

Figure 15:
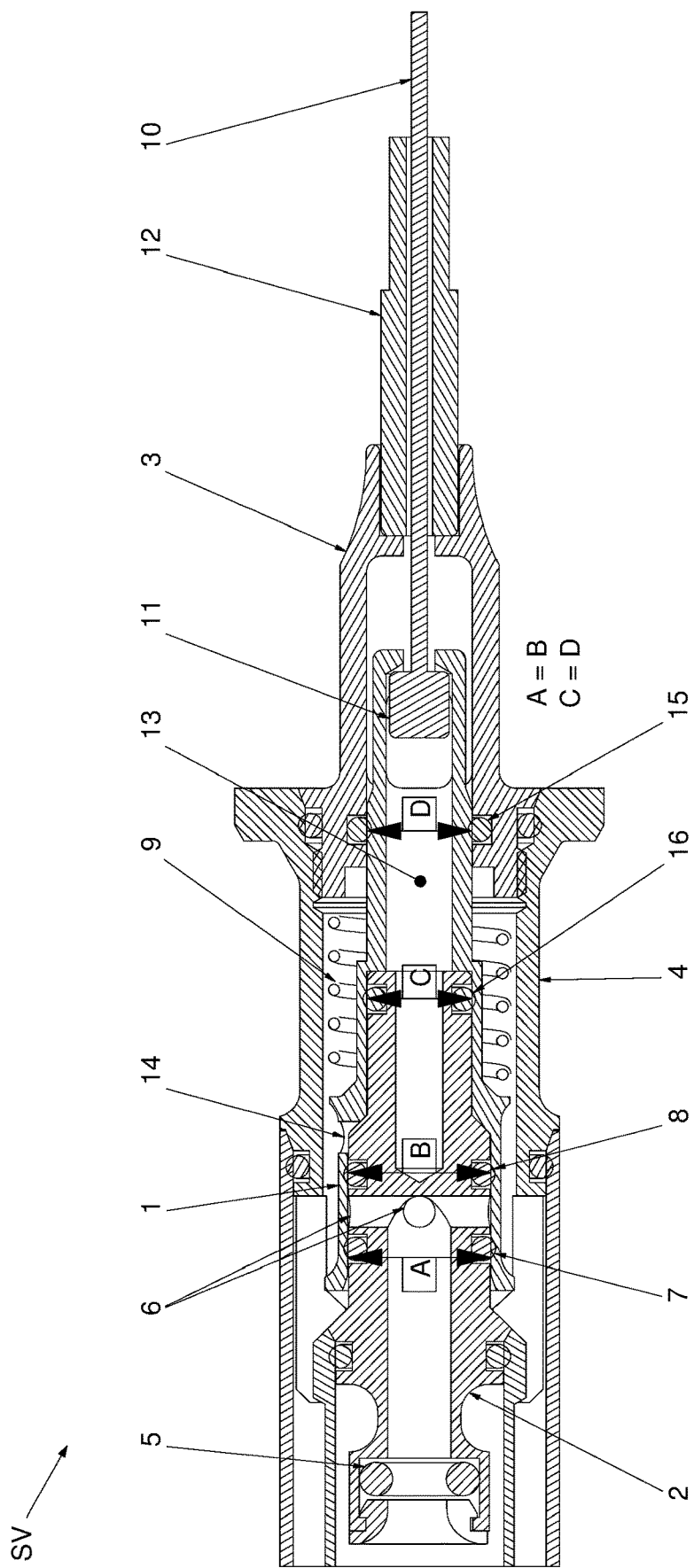

FIG. 15 illustrates an example of a balanced, direct-pull, inverse spool valve in accordance with the present disclosure—in situ (equal cross-sectional areas balance forces at seals, diameters A=B, C=D).

FIGS. 16A, 16B illustrate an example of a balanced, direct-pull, inverse spool valve in accordance with the present disclosure, with FIG. 16A illustrating the valve in a closed position and FIG. 16B illustrating the valve in an open position, with the valve including a spring bias to the closed position.

Figure 17:
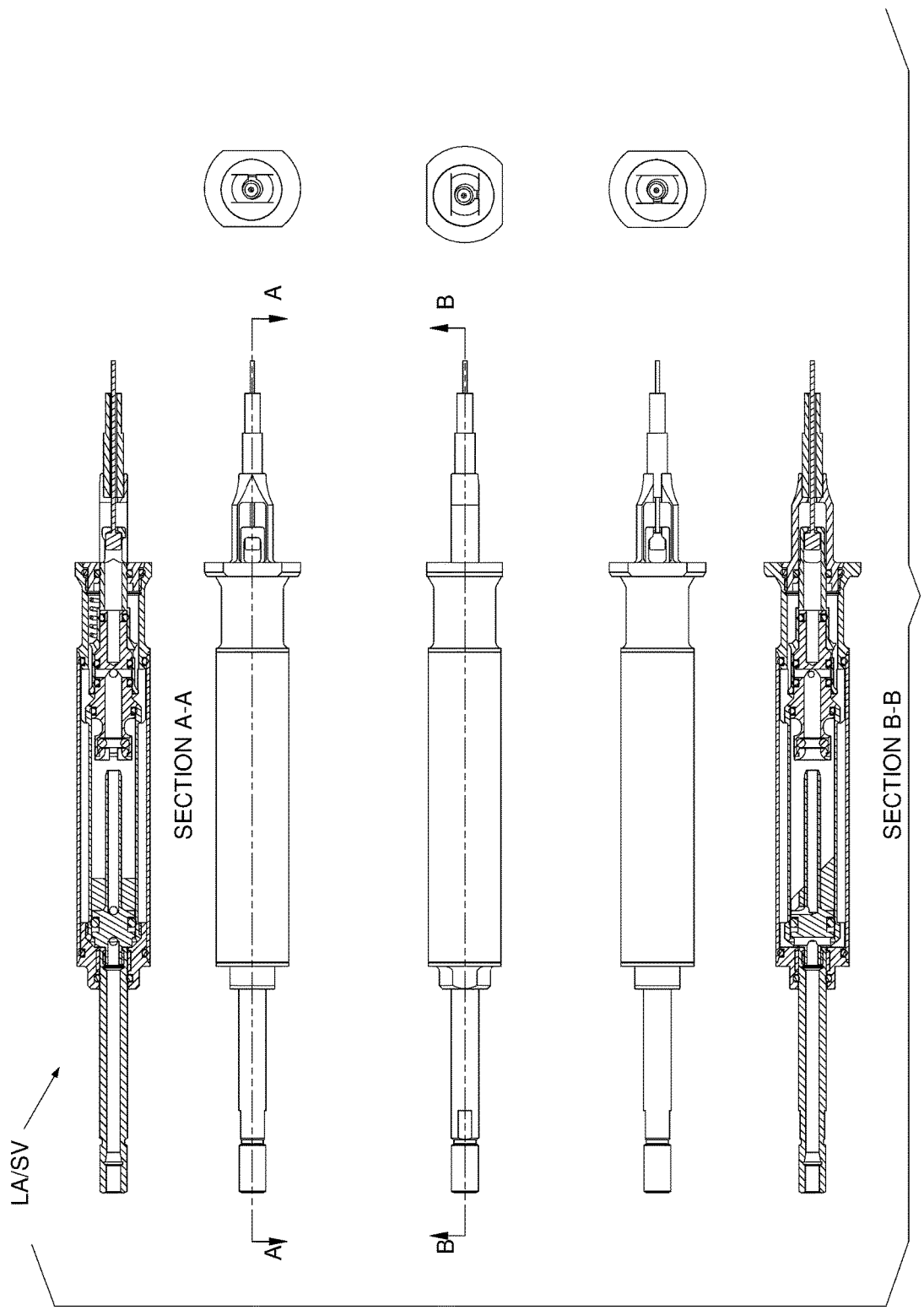

FIG. 17 illustrates views of an example of a linear actuator including a spool valve in accordance with the present disclosure including illustration of cable attachment and a detachment pocket in the actuator.

Figure 18:
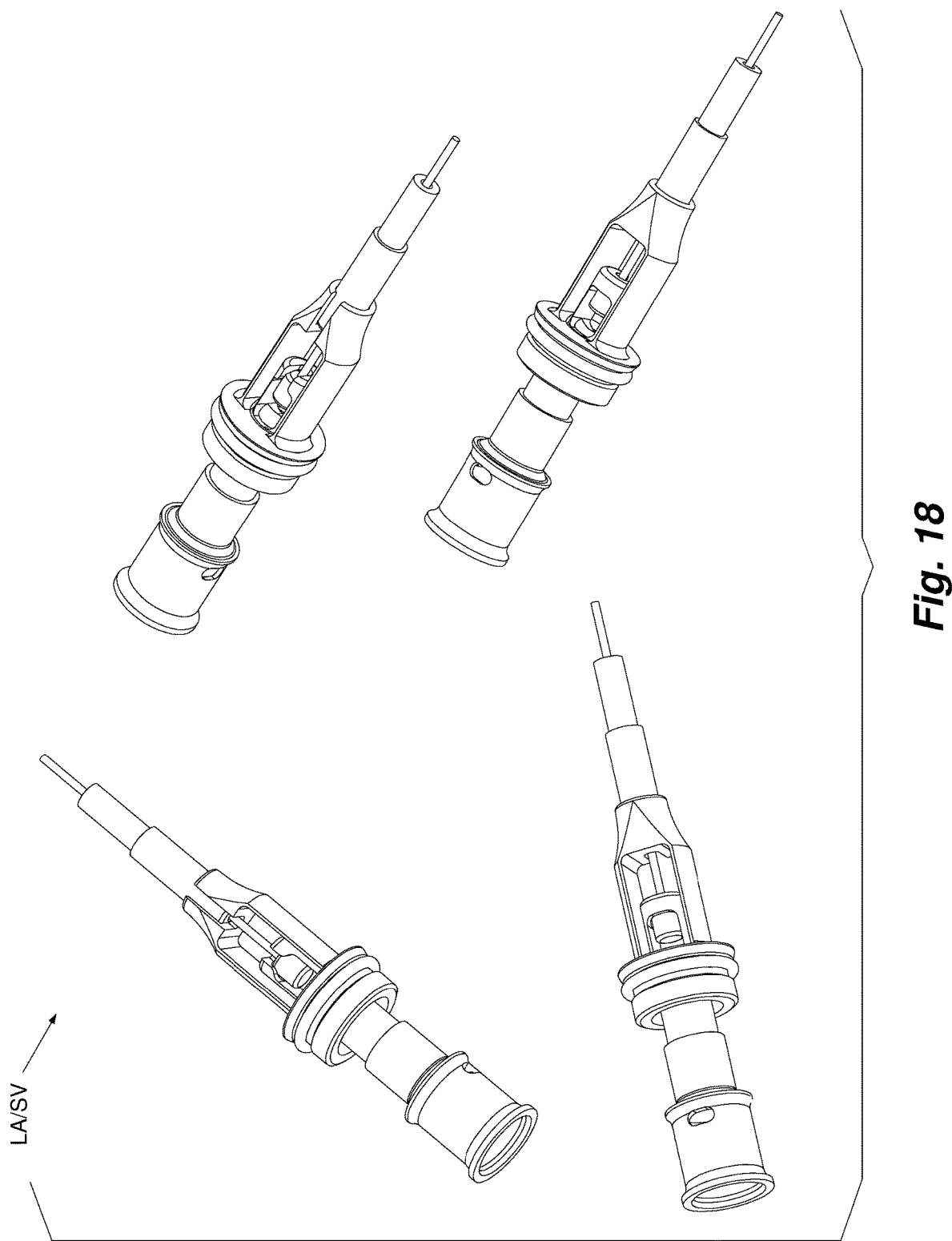

FIG. 18 illustrates views of an example of a linear actuator including a spool valve in accordance with the present disclosure including illustration of an actuator cable pocket, actuator, housing mount, cable and cable housing.

Figure 19:
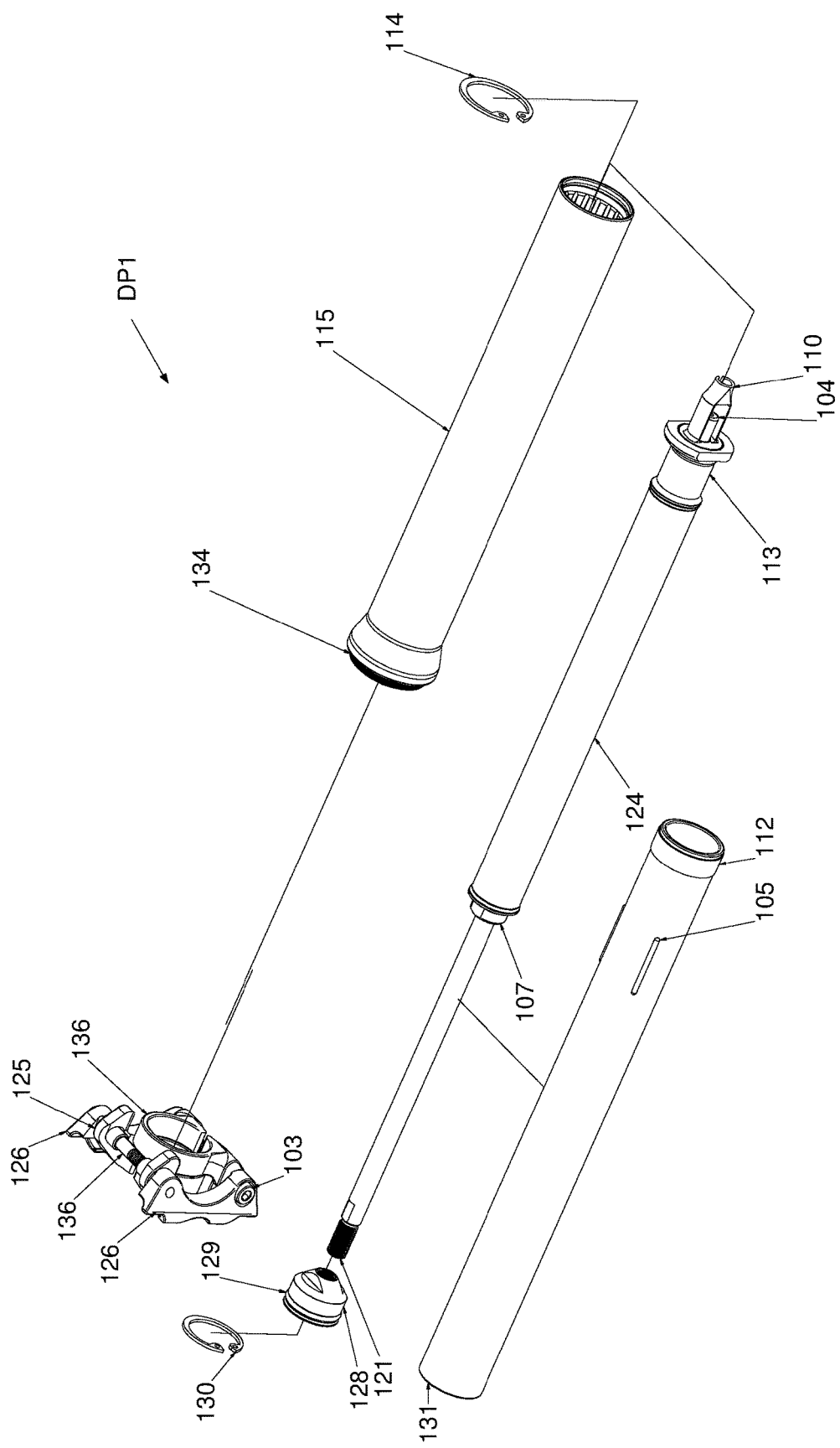

FIG. 19 illustrates an example of assembly/disassembly of a cartridge assembly within a shell of a dropper seatpost including an example of a linear actuator in accordance with the present disclosure.

Figure 20:
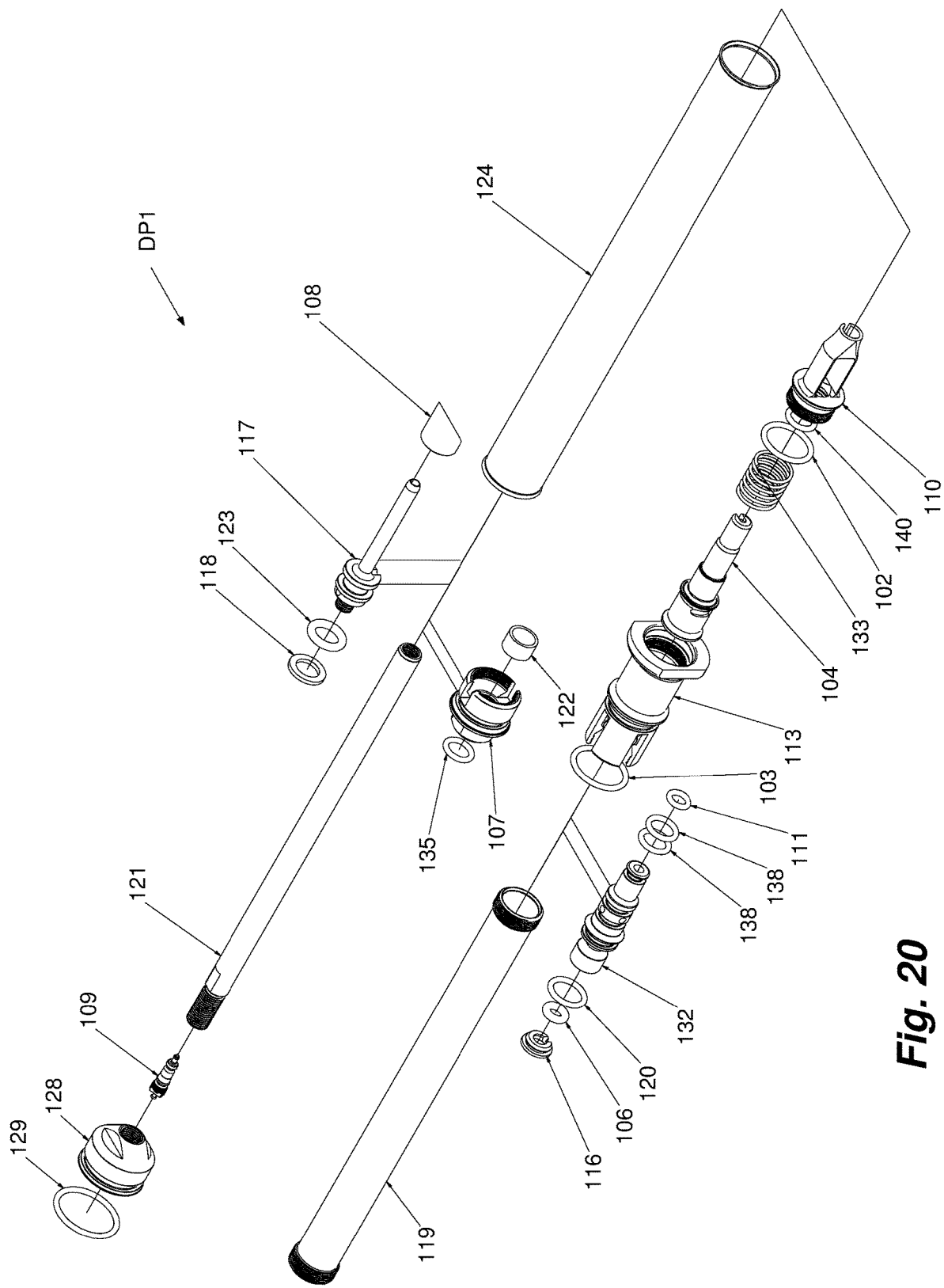

FIG. 20 illustrates an exploded view of the cartridge assembly of FIG. 19 including an example of a linear actuator in accordance with the present disclosure.

FIGS. 21A, 21B illustrate section views of an example of a first embodiment of a dropper seatpost including an example of a linear actuator in accordance with the present disclosure.

Figure 22:
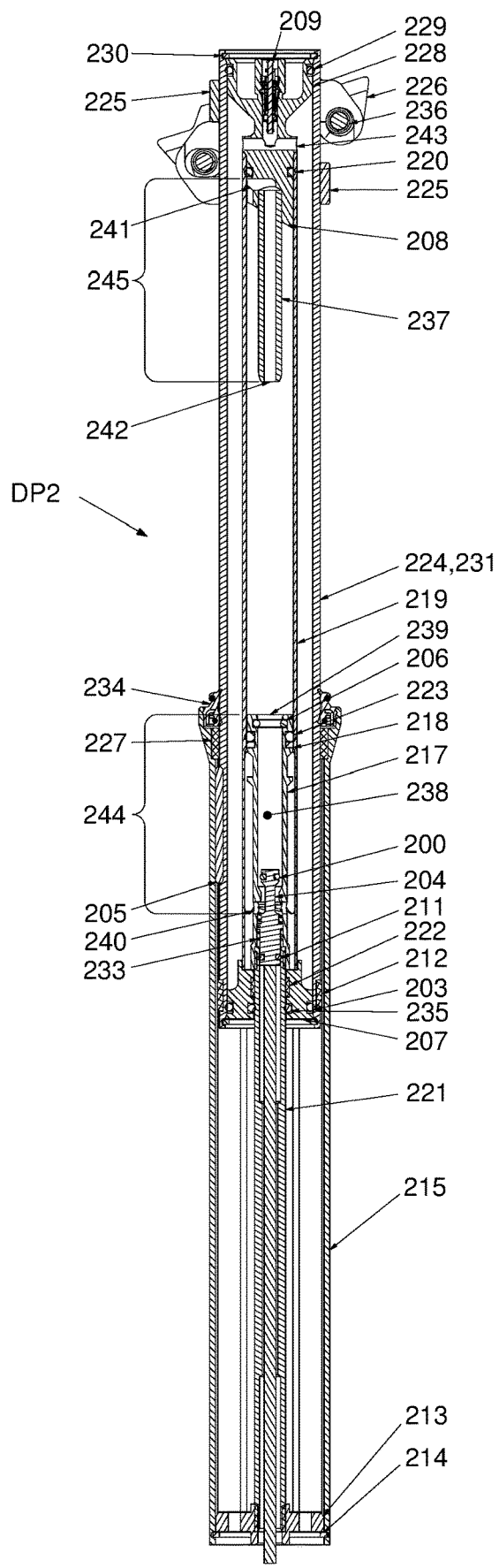

FIG. 22 illustrates a section view of an example of a second embodiment of a dropper seatpost including an example of a linear actuator in accordance with the present disclosure.

FIGS. 23A, 23B illustrate section views of an example of a third embodiment of a dropper seatpost including an example of a linear actuator in accordance with the present disclosure.

Figure 24:
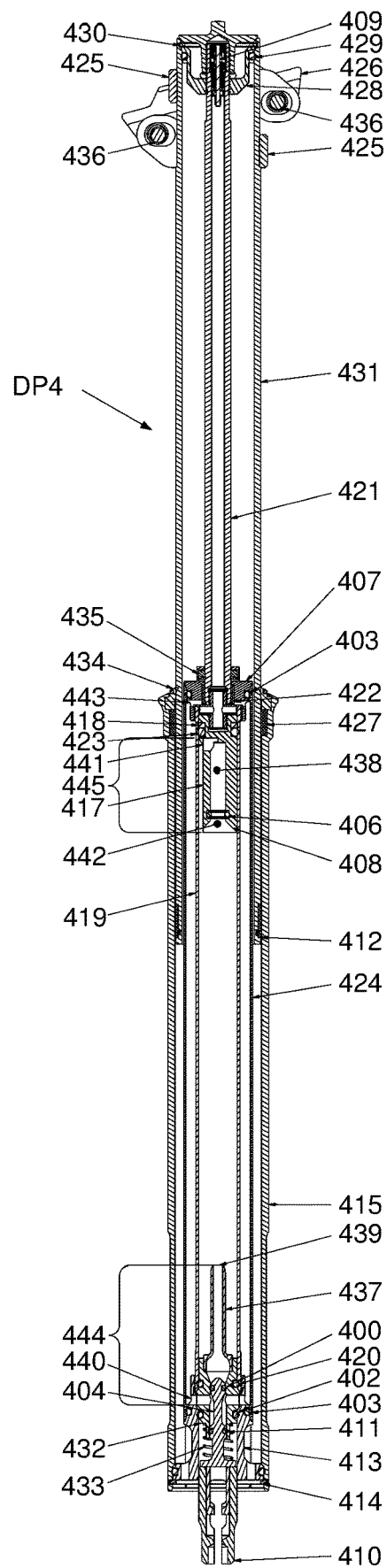

FIG. 24 illustrates a section view of an example of a fourth embodiment of a dropper seatpost including an example of a linear actuator in accordance with the present disclosure.

Figure 25:
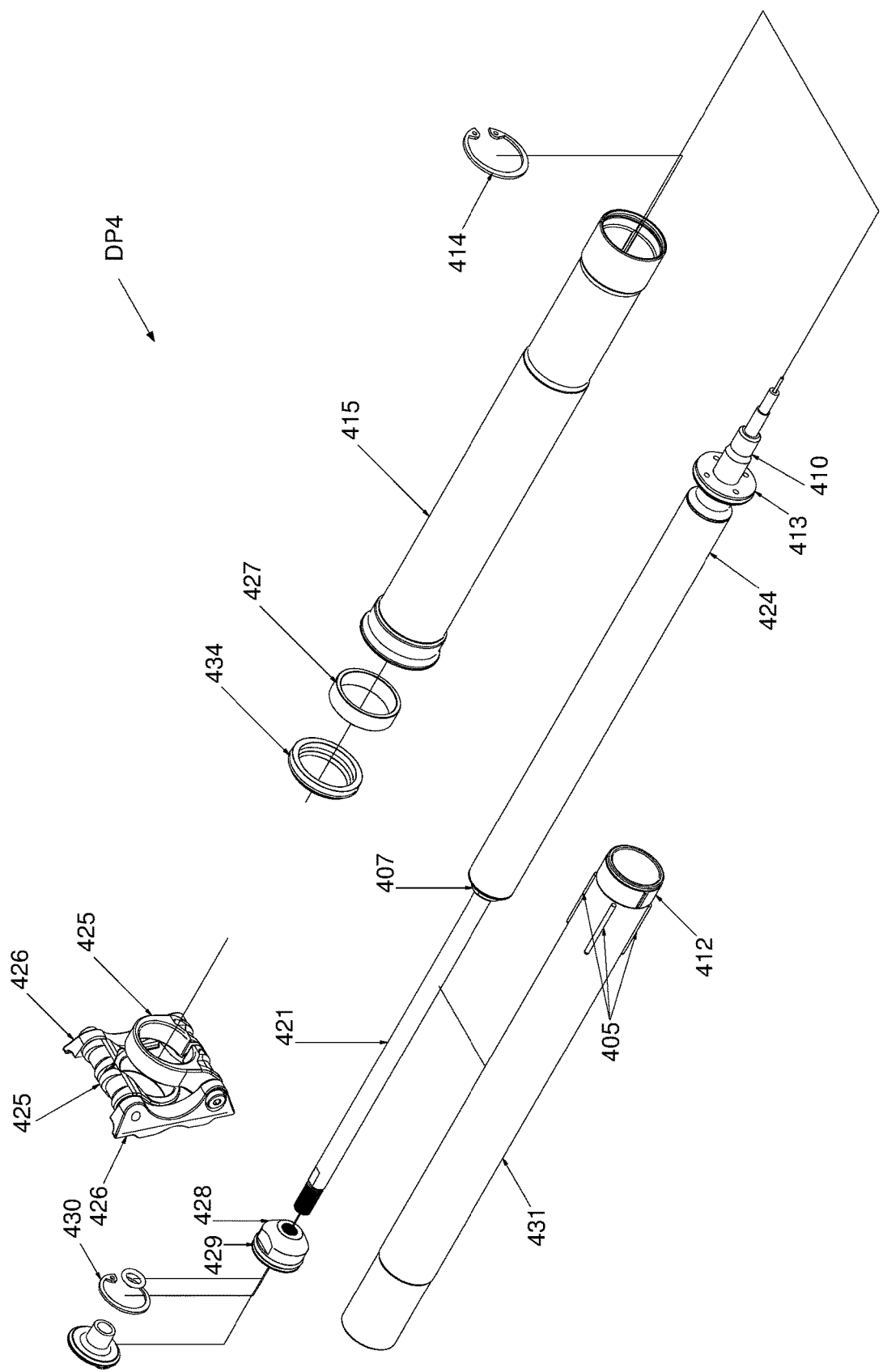

FIG. 25 illustrates an example of assembly/disassembly of a cartridge assembly within a shell of the fourth embodiment of a dropper seatpost including an example of a linear actuator in accordance with the present disclosure.

Figure 26:
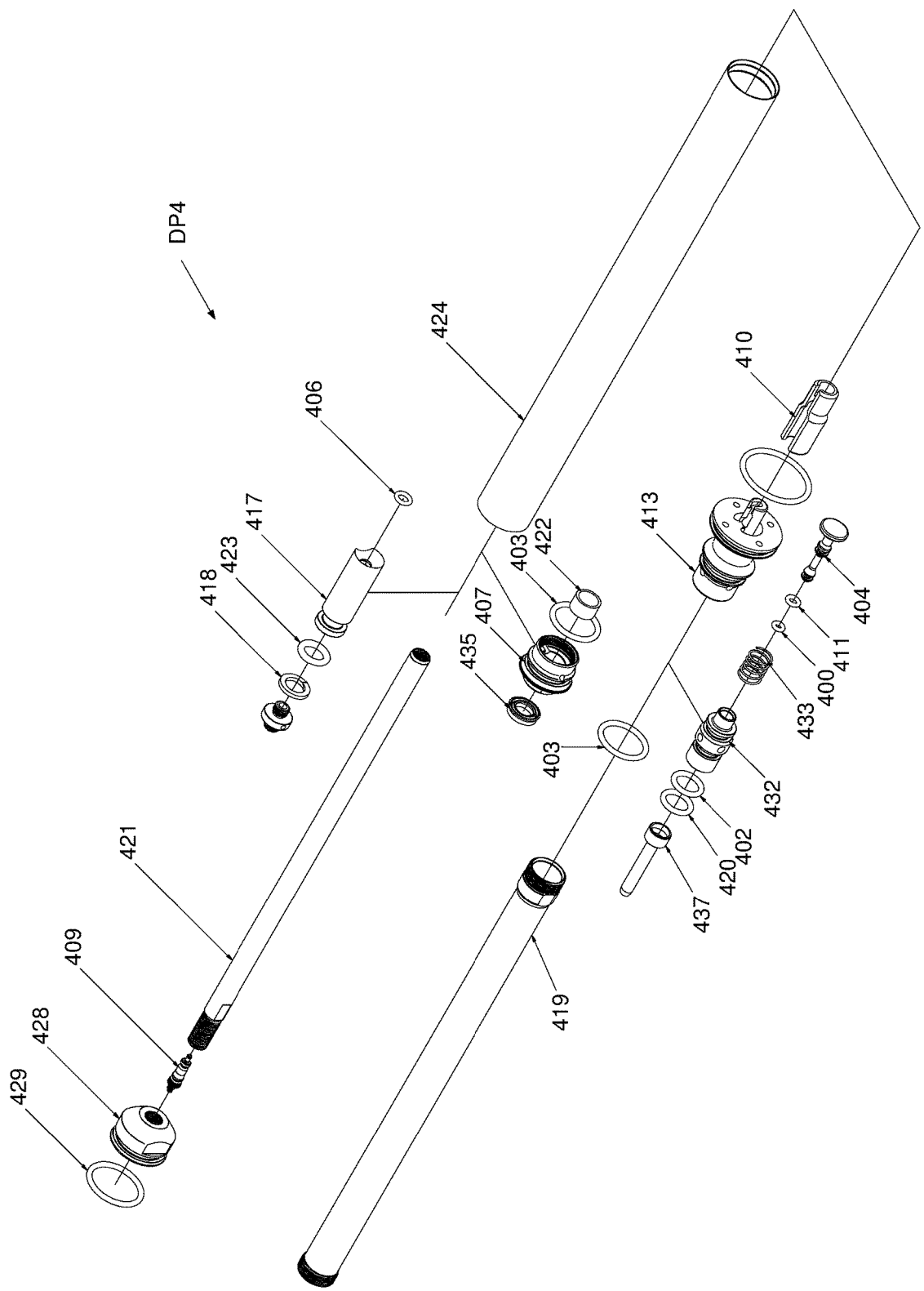

FIG. 26 illustrates an exploded view of the cartridge assembly of FIG. 25 including an example of a linear actuator in accordance with the present disclosure.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure.

Telescopic Linear Actuator with Self-Bleeding Hydraulics

With reference to FIG. 1, FIGS. 2A, 2B, 2C, 2D, FIGS. 3A, 3B, 3C, 3D, FIGS. 4A, 4B, FIGS. 5A, 5B, 5C, 5D, 5E, 5F, 5G, FIGS. 6A, 6B, 6C, 6D, 6E, 6F, FIGS. 7A, 7B, 7C, 7D, 7E, 7F, 7G, FIGS. 8A, 8B, 8C, 8D, 8E, 8F, FIGS. 9A, 9B, 9C, 9D, 9E, 9F, 9G, FIGS. 10A, 10B, 10C, 10D, 10E, 10F, FIGS. 11A, 11B, 11C, 11D, 11E, 11F, 11G, FIGS. 12A, 12B, 12C, 12D, 12E, 12F, examples of a telescopic linear actuator with self-bleeding hydraulics are described. With specific reference to FIG. 15, while there is a step down shown from A/B to C/D, such a configuration may vary. For example, A/B can equal C/D (e.g., A=B=C=D).

Valve

The configuration of the valve 20 can vary. Two valve types, poppet and spool, are shown in the embodiments but valve types are not limited to only these. The embodiments show a variety of valve 20 configurations, but do not show every type of valve 20 configuration (for example, the fourth embodiment (FIGS. 11A-11G, 12A-12F) can utilize a poppet valve instead of a spool valve, and the third embodiment (FIGS. 9A-9G, 10A-10F) can utilize a spool valve instead of a poppet valve).

The valve 20 typically can be configured to have at least two positions: opened and closed. In the open configuration, the valve 20 allows fluid to flow through a fluid pathway, the first fluid pathway 23. In the closed configuration, the valve 20 blocks flow through the fluid pathway. The valve 20 can also be partially opened or closed, "throttling" fluid flow. A valve 20 with more than two positions may also be used.

In most configurations, flow is allowed through the first fluid pathway 23 when the valve actuator 10 is moved in one direction and blocked when the valve actuator 10 returns to the original unactuated position via the valve spring 19.

The first fluid pathway 23 is a major component of the valve 20 and connects two volumes: Volume A and Volume B. The fluid port in communication with Volume A is the first fluid port 13, the fluid port in communication with Volume B is the second fluid port 15.

Volume A (e.g., a Fluid Column)

Volume A is known as the "fluid column" and may be filled with only liquid to remain incompressible.

Volume A is defined in large part by the piston cylinder 25. At one end of the piston cylinder 25 is a movable piston 7 with attached piston rod 3. The piston 7 and piston rod 3 are telescopically allowed to slide within the piston cylinder 25. Located at the other end of the piston cylinder 25 is either a valve 20 (as in the first embodiment (FIGS. 5A-5G, 6A-6F), second embodiment (FIGS. 7A-7G, 8A-8F), and fourth embodiment (FIGS. 11A-11G, 12A-12F)) or capped off (as in the third embodiment (FIGS. 9A-9G, 10A-10F)). If the end of the piston cylinder 25 is capped off, the valve 20 is typically part of the piston 7 (as in the third embodiment (FIGS. 9A-9G, 10A-10F)). These parts (the piston cylinder 25, piston 7, and cylinder cap 27/valve 20) enclose Volume A.

Since the piston 7 can telescopically slide within the piston cylinder 25, Volume A is a variable volume depending on the position of the piston 7 with respect to the rest of the components.

Volume B (e.g., a Reservoir)

Volume B is known as the "reservoir" and is filled with reserve liquid and gas.

Volume B is defined by the volume inside the reservoir tube 26, the volume behind the piston 7, and the volume inside the piston rod 3. Note: In the embodiments shown, Volume B is currently shown as concentrically located around Volume A, however this volume can exist separately. Therefore, Volume A has not been used to define Volume B's perimeter.

Volume B is a non-separator type accumulator in which both gas and liquid exist but there is no physical separator between the two—in contrast to a separator type accumulator in which an internal floating piston (IFP) separates the gas from the liquid. In a separator type accumulator with an IFP, the liquid side of the accumulator can be defined as "Volume C" and the gas side of the accumulator can be defined as "Volume D".

In the embodiments shown, Volume B is located concentrically around the piston cylinder 25. When this configuration is the case, the liquid side of Volume B is located on the same side as the valve 20 side of Volume A (the bottom of the linear actuator). However, in other embodiments, Volume B is not located concentrically around the piston cylinder 25. In addition, in other embodiments, the piston cylinder 25 does not lie within the reservoir, but rather, in a seat post configuration. Such a configuration may provide a compact configuration.

As configured, Volume B is a variable volume depending on the position of the piston 7 (and piston rod 3) with respect to the rest of the components. Volume B can be a fixed volume, such as in a case where the Reservoir and Fluid Column are separate.

Volume B can be pressurized to provide a bias force. This bias force can be used to automatically extend (or, in some instances, retract) the linear actuator when the valve 20 is opened. Volume B can also be open to the atmosphere and provide no bias force.

Bleed Components (Needle, Receptacle, Funnel)

The needle 12 is hollow and slides axially within the receptacle 30, creating a tube-within-a-tube overlap. An optional bleed seal 14 may be incorporated to close the gap between the two parts. A needle-guide may also be used to help guide the needle 12 into the receptacle 30.

The second fluid pathway 24 can be defined as having a third fluid port 16 and fourth fluid port 17. The third fluid port 16 is located at the top of Volume A and the top of the second fluid pathway 24. The fourth fluid port 17 is located at the bottom of the second fluid pathway 24.

The funnel 11 is located at the top of Volume A and helps channel rising gas bubbles 22 into the third fluid port 16 and top of the second fluid pathway 24, minimizing dead volume for gas bubbles 22 to get trapped.

Standard Linear Actuator Operation

Start with a fully-extended linear actuator, a closed valve 20, Volume A filled with non-compressible liquid. Liquid with a dissolved gas can be considered a single-phase fluid, liquid. Volume A should only have liquid in it for proper operation. Volume B filled with a liquid and a pressurized gas. Volume B contains two distinct fluid phases, gas and liquid (even though the liquid may also contain dissolved gas). As long as the valve 20 is closed, liquid cannot be transferred from Volume A to Volume B. Because the liquid is incompressible, Volume A cannot be reduced, and the linear actuator cannot be compressed. The piston 7 and piston rod 3 cannot be extended due to a hard stop at the end of its fully-extended stroke. In this configuration, the linear actuator may generally be described as "locked" in position.

When the valve 20 is opened, the liquid in Volume A can be transferred into Volume B through the first fluid pathway 23. Therefore, an open valve 20 allows Volume A to vary. Thus, the piston 7 and piston rod 3 can be pushed in and the linear actuator can be compressed. Applying an external force to the piston rod 3, in the direction of compression, forces fluid from Volume A through the valve 20 and first fluid pathway 23 into Volume B.

As the piston 7 moves further, Volume B increases because the back side of the piston 7 moves further into the piston cylinder 25. This increase in volume is reduced by the piston rod 3, since more of the piston rod 3 occupies space in Volume B. However, the amount of fluid transferred from Volume A is greater than the Volume B increase. Therefore, the amount of room remaining for the compressed gas in Volume B decreases. Because the amount of gas (moles) is constant, the overall pressure increases (unless this volume is open to atmosphere, but as stated, the starting conditions describe Volume B as filled with a pressurized gas). The gas pressure acts upon the fluid in Volume B.

The pressure in the linear actuator also acts upon the cross-section of the piston rod 3, trying to push it out of the linear actuator. As long as the compressive external force applied to the piston rod 3 is greater than the extensive force caused by the pressure in the linear actuator, the piston 7 and piston rod 3 will continue to be pushed/compressed into the linear actuator. The piston 7 and piston rod 3 will continue to move until either they reach the end of their stroke (hard stop) or the valve 20 is closed (creating an incompressible column of liquid in which they cannot move against).

The piston 7 can be stopped in place with the close of the valve 20. With the valve 20 closed, the piston 7 will not be able to be compressed further. As mentioned previously, there is an extension force acting upon the piston rod 3.

When the valve 20 is closed, the piston rod 3 extension force is overcome by a compression force acting upon the back side of the piston 7. This force comes from the pressure in Volume B being greater than the pressure in Volume A.

Recall that when the valve 20 is open, the pressure in Volume A is equal to the pressure in Volume B. But when the valve 20 is closed, the pressure in Volume A becomes independent of Volume B. If Volume A increases by extension of the piston 7, the pressure will drop (assuming constant temperature). This is because the moles of liquid (and any gas entrapped) is constant. If the piston 7 is extended, Volume B will decrease, and the pressure will increase. The increase in pressure of Volume B increases the compressive force acting upon the back side of the piston 7. However, there is still pressure inside Volume A acting in the extension direction, on the face of the piston 7. The further the piston 7 travels in the extension direction, the greater the backside compression force and the less the front side extension force. The net force becomes a compressive force. This net compressive force is enough to overcome the extension force on the piston rod 3. This force holds the piston 7 against the fluid column.

It is possible to add an external extension force to the piston rod 3 simply by pulling on the piston rod 3. This force can be enough to overcome the net compressive force and allow the piston 7 to move. Because movement of the piston 7 reduces the pressure inside Volume A, any dissolved gasses bubble out. Since there is gas in Volume A, the piston 7 can move as the gas is expanded. Releasing the external extension force increases Volume A pressure and the gas dissolves back into the liquid.

If the compressive external force is released from the piston rod 3 and the valve 20 is opened, allowing fluid to flow from Volume B to Volume A, the linear actuator will extend. This is because the internal pressure acts upon the surface area of the piston rod 3, forcing it outward. Upon opening the valve 20, the pressures in Volume A and Volume B equalize making the previous net compressive force zero. However, there is still an expansion force on the piston rod 3 due to the pressure difference inside the linear actuator vs outside (the atmospheric pressure). As the piston rod 3 is forced outward, it moves the piston 7 with it. As the piston 7 moves outward, Volume A increase and the pressure inside decreases compared to the pressure in Volume B. This pressure differential forces fluid to flow from Volume B, back through the valve 20 (first fluid pathway 23), and into Volume A.

The piston 7 and piston rod 3 will continue to move until either they reach the end of their stroke (hard stop) or the valve 20 is closed. If the valve 20 is closed midway through extension, the piston 7 and piston rod 3 will stop extending. This is because of the same reason as mentioned previously: the internal pressure acts upon the back side of the piston 7 holding it against the fluid column with a net compressive force. Likewise, the piston 7 and piston rod 3 cannot be compressed because of the fluid column beneath them. In this configuration, the linear actuator may generally be described as "locked".

Note: As long as the linear actuator is held upright or substantially upright and there is sufficient liquid in Volume B, the second fluid port 15 of the first fluid pathway 23 is submerged under liquid in Volume B. The angle of which the linear actuator can be tilted is a function of the liquid level in Volume B. Tilting the linear actuator far enough to where the second fluid port 15 is no longer submerged may allow gas to be drawn into Volume A upon opening the valve 20 and the extension of the linear actuator.

Compromised Linear Actuator Operation

A linear actuator with a non-separator type accumulator is simple, but its operation can be easily compromised. During operation, gas can unintentionally infiltrate Volume A (as is the case with hydraulic linear actuators—separator and non-separator types alike). Gas can enter Volume A either by leaking past the piston seal 8, leaking past valve 20 seal(s), or by being drawn in from Volume B through the valve 20. In a non-separator type accumulator, the gas and liquid are not physically separated. If the linear actuator is tilted so that the second fluid port 15 is not submerged in liquid, as the linear actuator is extended, gas can be drawn in. The separator type accumulator configuration in which there is an internal floating piston ("IFP") can also be compromised if the IFP seals leak. Leakage of the IFP allows gas to reside on the liquid side of the IFP (Volume C), and able to be drawn in through the valve 20. If gas becomes trapped in Volume C, there is no easy way for it to return to Volume D.

Note: without a way to purge gas from Volume A, the chances of a non-separator type accumulator being compromised is much greater than a separator type accumulator. In the past, this purge operation involved manually addressing the issue (through disassembly, a bleed screw, or a secondary purge valve. Therefore, it was best practice to architect separator type accumulators and not obvious to architect a non-separator type accumulator unless one incorporates some sort of bleed mechanism (as described later). But as described previously, this arrangement is not infallible, the IFP seals can leak. The seals in the IFP also greatly increase the running friction of the linear actuator—requiring greater actuation forces and pressures.

Gas in Volume A is compressible; therefore, the piston 7 and piston rod 3 will be allowed to move even if the valve 20 is closed. This is considered a compromised system because the piston 7 and piston rod 3 are no longer able to hold position when the linear actuator is in the locked configuration. Hydraulic linear actuators will eventually become compromised due to gas entering Volume A. However, if this gas can be quickly and easily purged from Volume A, the linear actuator can continue in service.

Until now, it has not been easy to automatically purge gas from Volume A without disassembly or a separate valve (either a manual purge valve or a bleed screw). This is because gas rises to the top of the fluid column. Separator type accumulators can be inverted, allowing the valve 20 to be at the top of the fluid column, forcing fluid through the valve 20 would carry the gas with it and out of Volume A. However, bleeding air out of the valve 20 only transfers it to the wrong side of the IFP (volume C) where the gas does not belong, enabling it to be drawn back into the fluid column. Non-separator type accumulators suffer from a different problem. They utilize the valve 20 on the bottom of the fluid column so liquid can be drawn through the valve 20 and not gas (e.g., unless a fluid path were made from the valve 20 to the liquid side of the reservoir, such as coiled tubing). Because the entrapped gas is at the top of the fluid column and the valve 20 at the bottom, the only way to purge the gas is to move the top of the fluid column close to the valve 20 (as in moving the piston 7 closer to the valve 20, or if the piston 7 is the valve 20, the piston 7 closer to the cap of the fluid column) so the gas can be drawn through the valve 20. However, there is typically dead volume at the bottom of the stroke and in the valve 20 and it becomes impossible to remove the last remaining amount of gas. Since the gas does not reach the valve 20 until the end of the stroke, there is not enough fluid to drive the gas the rest of the way through the valve 20 and out into the reservoir.

Automatic Gas Purging Architecture

The solution to automatically purging gas from Volume A is to transfer the liquid/gas from the top of Volume A during the stroke, through the first fluid port 13 of the valve 20, and out the second fluid port 15 into Volume B of a non-separator type accumulator where the liquid/gas will naturally become re-separated in Volume B due to their density/weight difference. The second fluid port 15 of the valve 20 should be located at the bottom of Volume B so that only liquid is transferred back into Volume A on the return stroke. Because the distance between the top of Volume A and bottom of Volume B is variable depending on the linear actuator's extension, the mechanism of transfer should accommodate this variation.

To accommodate the distance variation, a novel telescopic needle 12 and receptacle 30 architecture has been developed. The needle 12 and receptacle 30 form a telescopic fluid pathway that can vary in length with the stroke of the linear actuator LA. The telescopic fluid pathway can be defined as having a first fluid pathway 23 and a second fluid pathway 24. The first fluid pathway 23 can take the form of either the needle 12 or the receptacle 30. Likewise, the second fluid pathway 24 can take the form of either the needle 12 or the receptacle 30. In other words, the configuration of the telescopic fluid pathway can vary—with either the needle 12 or receptacle 30 on top. The first fluid pathway 23 has the same structure as previously described, with a first fluid port 13, valve 20, and a second fluid port 15. The second fluid pathway 24 can be defined as having a third fluid port 16 and fourth fluid port 17. The third fluid port 16 is located at the top of Volume A and the top of the second fluid pathway 24. The fourth fluid port 17 is located at the bottom of the second fluid pathway 24. In examples, the first fluid pathway 23 and second fluid pathway 24 telescopically overlap. In other examples, as will be later described, the first fluid pathway 23 and second fluid pathway 24 do not telescopically overlap. When telescopically overlapped, the first fluid pathway 23 communicates with the second fluid pathway 24 at the first fluid port 13 and fourth fluid port 17. The second fluid pathway 24 extends the first fluid pathway 23 so that the fluid intake of the first fluid port 13 is replaced by the fluid intake of the third fluid port 16. Therefore, fluid can be transferred from the top of Volume A.

Depending on the orientation of the third fluid port 16 with respect to the very top of Volume A, a funnel 11 may be provided. Without a funnel 11, if the linear actuator LA is titled so that the third fluid port 16 is below the upper part of Volume A, a gas pocket may form preventing gas from being drawn into the second fluid pathway 24. The funnel 11 helps channel rising gas bubbles 22 into the third fluid port 16 and top of the second fluid pathway 24, minimizing dead volume for gas bubbles 22 to get trapped.

The needle 12 is hollow and slides axially within the receptacle 30, creating a tube-within-a-tube overlap. To allow the needle 12 to slide within the receptacle 30 and to account for manufacturing tolerances and misalignment in the assembly, there is a gap. The gap should be sealed with a bleed seal 14 or the gap should be small enough to generate high resistance to fluid flow through it. Not enough resistance to fluid flow through this gap will allow too much fluid to flow through the overlap, bypassing the second fluid pathway 24. The needle 12 and receptacle 30 can be integrated into the valve 20, piston 7 or cylinder cap 27 depending on the desired configuration.

The needle 12 and receptacle 30 can overlap during the entire stroke of the linear actuator LA (full-time telescopic fluid pathway) or only during a portion of it (part-time telescopic fluid pathway). In examples, in the case of a full-time telescopic fluid pathway, the first fluid pathway 23 and second fluid pathway 24 are always in communication with each other and telescopically overlapped. Therefore, the second fluid pathway 24 can be considered always active. This means that when fluid flows, it will always flow through the first fluid pathway 23 and second fluid pathway 24. In examples, in the case of a part-time telescopic fluid pathway, during part of the linear actuator stroke, the first fluid pathway 23 and second fluid pathway 24 do not overlap and are therefore not in communication with each other. Because of this, the second fluid pathway 24 can be considered inactive during this portion of the linear actuator stroke (the first fluid pathway 23 remains active). The second fluid pathway 24 becomes active as soon as the first fluid pathway 23 and second fluid pathway 24 overlap and either a) form a seal with the bleed seal 14 or b) close the gap enough to where the resistance to fluid flow through the gap is greater than fluid flow through the second fluid pathway 24.

The operation of the part-time gas purging architecture will now be explained in detail. Starting with the linear actuator LA fully extended, the needle 12 and receptacle 30 are separated. Because there is no telescopic overlap with the first fluid pathway 23, the second fluid pathway 24 is inactive, meaning fluid is not actively being force through it. This is because the pressure acting on the third fluid port 16 is the same as the fourth fluid port 17 and there is no bias acting to move fluid through the fluid pathway. As the linear actuator LA is compressed (valve 20 open), fluid flows through the first fluid pathway 23 by entering the first fluid port 13, passing through the valve 20, and out into Volume B through the second fluid port 15. Any gas in Volume A has been accumulated at the third fluid port 16 and top of the second fluid pathway 24. However, since the second fluid pathway 24 is inactive and there is no fluid flow, the gas bubbles 22 remain in place and are not purged out of Volume A.

As the linear actuator LA is compressed further (valve 20 open), the first fluid pathway 23 and second fluid pathway 24 will overlap, activating the second fluid pathway 24. As fluid begins to flow through the second fluid pathway 24 it carries the entrapped gas bubbles 22 with it. The second fluid pathway 24 is restricted enough (in cross sectional area) that the fluid cannot easily bypass the gas bubbles 22 and the gas bubbles 22 cannot easily slip out of the fluid stream. The fluid sweeps the gas bubbles 22 through the second fluid pathway 24, into the first fluid pathway 23, and then out into the Volume B.

Once the gas bubbles 22 enter Volume B, the gas separates from the liquid naturally, due to density differences and gravity. Because of the orientation of the second fluid port 15 with respect to the Volume B (i.e. the second fluid port 15 is located at the bottom of the volume where the liquid lies), the gas bubbles 22 rise away from the second fluid port 15 and the second fluid port 15 remains submerged under liquid. This creates a one-way passage of gas into Volume B from Volume A where the gas then naturally separates from the liquid.

Gas will continue to be purged as long as there is fluid flow. Fluid will flow through the fluid pathways until the linear actuator LA is fully compressed. Depending on the entrapped volume of gas, Volume A may not be completely purged and another actuation cycle may be needed. Because the purge happens every cycle, if any gas enters between cycles, it will be purged from Volume A in the next stroke. The volume of gas purged depends on the geometry of the needle 12, receptacle 30, piston cylinder 25 and active length of stroke. The embodiments shown have been designed to purge a relatively large volume of gas. The needle 12 and receptacle 30 can be shorter, making the active length of stroke shorter, purging less volume of gas.

From a fully compressed linear actuator state, as the linear actuator LA extends and Volume A increases, liquid from Volume B is drawn through the first fluid pathway 23. In the beginning of the stroke, the first fluid pathway 23 and second fluid pathway 24 are overlapping and in communication with each other. Therefore, the fluid flows from the first fluid pathway 23, through the second fluid pathway 24 and out the third fluid port 16, refilling Volume A. In a part-time gas purging architecture, the first fluid pathway 23 and second fluid pathway 24 will eventually separate. This deactivates the second fluid pathway 24. Fluid then flows out the first fluid port 13, refilling Volume A until the linear actuator LA is fully extended.

If un-purged gas remains in the Volume A or purged gas in Volume B is drawn back through the second fluid port 15 (possible to do if the system is actuated fast enough to where the gas bubbles 22 do not have time to rise to the top of Volume B, or if the linear actuator LA is tilted far enough and the second fluid port 15 is exposed to the gas in Volume B), the process repeats itself the next time the linear actuator LA is actuated. The gas bubbles 22 rise to the top, are funneled into the second fluid pathway 24, and staged for evacuation.

Full-time gas purging architecture operates in the same manner; however, in examples, the second fluid pathway 24 is always active due to a constant telescopic overlap at the first fluid port 13 and fourth fluid port 17. Unlike the part-time purging architecture, gas is purged through the entire stroke of the linear actuator LA. This allows for the maximum volume of gas to be purged. The volume of gas to be purged during normal operation, however, may be small.

Balanced, Direct-Pull, Inverse Spool Valve

With reference to FIGS. 13A, 13B, 13C, 13D, 13E, FIG. 14, FIG. 15, FIGS. 16A, 16B, FIG. 17, FIG. 18, examples of a balanced, direct-pull, inverse spool valve are described.

Inverse Balanced Spool Valve Specifics

Spool valve SV subcomponents: valve core SV2, valve actuator SV1, seals, return bias member (optional)

The return bias member for either valve can be a physical spring SV9 (compression, extension, torsion, leaf, etc.) or gas spring.

The valve typically can be configured to have at least two positions: opened and closed. In the open configuration, the valve allows fluid to flow through a fluid pathway, the "first fluid pathway". In the closed configuration, the valve blocks flow through the fluid pathway. The valve can also be partially opened or closed, "throttling" fluid flow.

In most configurations, flow is allowed through the first fluid pathway when the valve is actuated in one direction by applying an external force to the poppet or spool and blocked when the valve returns to the original unactuated position via the return bias member 9.

The first fluid pathway connects two volumes: Volume A SV17 and Volume B SV18 of the linear actuator LA described in the "Telescopic Linear Actuator with Self-Bleeding Hydraulics" section above. The fluid port in communication with Volume A SV17 is the first fluid port SV5, and the fluid port in communication with Volume B SV18 is the second fluid port SV6.

Variations in pressure in both Volume A SV17 and Volume B SV18 should apply no biasing force to the valve actuator SV1. In some instances, the valve actuator SV1 may be designed to be unbalanced in order to provide a bias force in one direction.

High pressure seals leak to low pressure reservoir rather than to external atmosphere.

Spring SV9 return bias, gas spring return bias, or combination of both. For example, to reduce weight, a gas spring bias may be utilized. The gas spring bias may be the result of utilizing an unbalanced valve. When an unbalanced valve is used as a gas spring bias, a decrease in gas pressure (e.g., due to a leak) may be detrimental to the performance of the bias. By way of further example, a metal spring SV9 may be used. However, while a metal spring SV9 may alleviate concerns relating to a decrease in gas pressure, the use of a metal spring SV9 may result in increasing the weight.

Direct pull, no reversal of actuation direction needed

Tool-less and hardware-less cable SV10 attachment.

Balanced, Inverse Spool Valve Architecture

The spool valve SV consists of two main components, a valve core SV2 and valve actuator SV1, and is in communication with two chambers, Volume A SV17 and Volume B SV18. The spool valve SV can be integrated into Volume A SV17 and/or Volume B SV18 or independent from the two volumes. The valve core SV2 and chamber(s) can be one piece or separate pieces to aid in manufacturability.

The valve core SV2 contains a first fluid port SV5 and a second fluid port SV6. The first fluid port SV5 connects to Volume A SV17. The second fluid port SV6 connects to Volume B SV18. Two high-pressure seals (inward high-pressure seal SV7 and outward high-pressure seal SV8) are installed in circumferential grooves around the valve core SV2 and on either side of the second fluid port SV6.

The valve actuator SV1 slides coaxially over the valve core SV2 and over the high-pressure seals (inward high-pressure seal SV7 and outward high-pressure seal SV8). The valve is in the "closed" configuration when the valve actuator SV1 is in sealing contact with both high-pressure seals (inward high-pressure seal SV7 and outward high-pressure seal SV8). In this configuration, Volume A SV17 is separated from Volume B SV18. The valve is in the "open" configuration as soon as at least one of the high-pressure seals (inward high-pressure seal SV7 or outward high-pressure seal SV8) loses sealing contact with the valve actuator SV1, allowing Volume A SV17 to communicate with Volume B SV18.

The valve actuator SV1 can be axially moved to the open or closed configuration by a bias force. This bias force can come from a spring SV9, an externally applied force, a non-contact force (e.g. magnetic force) or a combination of the three. For example, to open the valve, an external pull force can be applied to the valve actuator SV1, compressing/extending a spring SV9 as the valve actuator SV1 moves toward the open position. When the external pull force is released, the compression/extension force from the spring SV9 returns the valve actuator SV1 to the closed position. In another example, the valve actuator SV1 can be moved by an external pull force in one direction and an external push force in the other direction. In yet another example, the valve actuator SV1 can be pushed and/or pulled via an electric solenoid or the valve actuator SV1 may be a component of the solenoid, being pushed and/or pulled with a magnetic field.

To apply an external force to the valve actuator SV1, one side of the valve actuator SV1 is exposed to the environment at atmospheric pressure so that an external force can be applied. The other side of the valve actuator SV1 is exposed to Volumes A and B. Atmospheric pressure is separated from Volume A SV17 and Volume B SV18 by the environment seal SV15. The atmospheric pressure and pressures within Volume A SV17 and Volume B SV18 may all be different. Because of this, a bias force can also result from pressure differences between volumes and/or atmosphere.

In a pressure balanced valve configuration, regardless of the differences in pressure between the volumes and/or atmosphere, no net bias force acts upon the valve actuator SV1 due to pressure. This does not mean that pressures do not apply forces to the valve actuator SV1. Any pressure that applies a force to the valve actuator SV1 in one direction is balanced by pressure applying a force in an opposite direction. The net bias force is zero.

Pressure applies forces perpendicular to exposed surfaces. In the case of the valve actuator SV1, any force vector component acting along the axis of actuation produces a bias force on the valve actuator SV1. The sum of these bias forces should be zero for the valve to be considered balanced.

In the configuration shown (Configuration 1), pressure in Volume A SV17 applies a force only to the exposed surface of the valve actuator SV1 between the two high pressure seals (inward high-pressure seal SV7 or outward high-pressure seal SV8). Since this surface is cylindrically parallel to the axis of actuation, the resulting force is perpendicular with no force vector acting in the axis of actuation. Therefore, Volume A SV17 does not produce a bias force on the valve actuator SV1.

Pressure from Volume B SV18 and the environment acts upon the valve actuator SV1 as well. However, due to the step in the valve actuator SV1 and a first breathe port SV13, the surfaces with a resulting force vector component cancel each other out. In this configuration, the step is designed specifically for this cancellation of forces.

In another configuration (Configuration 2), the step can be alternately arranged, so that the resulting forces do not balance each other out and a net bias force is intentionally created. In this configuration, the pressure in Volume B SV18 is significantly higher than the atmospheric pressure in the environment. The net bias force on the valve actuator SV1 from Volume B SV18 acts to draw the valve actuator SV1 inward. The net bias force on the valve actuator SV1 from atmospheric pressure acts to draw the valve actuator SV1 outward. However, because the pressure in Volume B SV18 is significantly greater than atmospheric pressure, the net bias force is inward. If the atmospheric pressure were greater than the pressure in Volume B SV18, the valve actuator SV1 would be biased outward.

In another configuration (Configuration 3), the step can be removed or even reversed. When Volume B SV18 pressure is greater than atmospheric pressure, the valve actuator SV1 is biased outward.

Configuration 4 lacks the first breathe port SV13. Because of this, a vacuum is pulled between the outward high-pressure seal SV8 and the valve actuator SV1. The vacuum can be used as a bias force to hold the valve actuator SV1 inward.

Consider again Configuration 1. High pressure seal leaks can be detrimental to the proper operation of equipment. If the inward high-pressure seal SV7 leaks, the fluid in Volume A SV17 leaks to Volume B SV18. If the outward high-pressure seal SV8 leaks, the fluid in Volume A SV17 leaks to the environment. To prevent the later leak, a low-pressure seal 16 and second breathe port SV14 can be added (Configuration 5).

In this configuration (Configuration 5), if the outward high-pressure seal SV8 leaks, the fluid leaks into an auxiliary volume between the valve actuator SV1 and valve core SV2 and between the outward high-pressure seal SV8 and the low-pressure seal SV16. If this volume was not ported back to Volume B SV18 by the second breathe port SV14, pressure would continue to build as fluid leaks into it. This could cause the low-pressure seal SV16 to leak as well. Therefore, the second breathe port SV14 provides a way for the fluid to leak into Volume B SV18 rather than the environment. Because pressure in the auxiliary volume applies a force only to the exposed surface of the valve actuator SV1 between the two high pressure seals (inward high-pressure seal SV7 or outward high-pressure seal SV8), and this surface is cylindrically parallel to the axis of actuation, the resulting force is perpendicular with no force vector acting in the axis of actuation. Therefore, this auxiliary volume, low pressure and second breathe port SV14 does not add a bias force on the valve actuator SV1.

In a pressure unbalanced valve, the net bias force can be used as a valve actuator SV1 return force. For example, consider Configuration 2 with Volume B SV18 pressure greater than atmospheric pressure. The net bias acts to hold the valve closed. To open the valve, an external pull force greater than the net bias inward force can be applied to the valve actuator SV1, moving the valve actuator SV1 toward the open position. When the external pull force is released, the net bias force takes over and returns the valve actuator SV1 to the closed position. In another example, the net bias force can act to hold the valve open. When an external push force greater than the bias force is applied to the valve actuator SV1, the valve actuator SV1 will be urged toward the closed direction. When the external force is removed, the valve actuator SV1 is biased to the open position.

A drawback to utilizing a pressure unbalanced valve is pressure can be lost in Volume B SV18. A reduction in pressure will reduce the bias force caused by that pressure. A complete loss of pressure in Volume B SV18 and equalization with the atmospheric pressure would remove all pressure induced bias.

Therefore, Configuration 5 may be desirable for linear actuators, and more specifically dropper seat posts, due to reliable valve actuator SV1 bias (non-pressure biased, pressure balanced, but spring SV9 bias closed) and seal redundancy.

Throttling, Flow Modulation

As the valve actuator SV1 opens, the second fluid port SV6 becomes more and more unblocked by the valve actuator SV1. A partial actuation, where the valve actuator SV1 partially blocks the second fluid port SV6, provides resistance to flow (more than a fully open port). Therefore, the speed of the flow can be modulated.

Direct Pull Actuation

For remote actuation of the spool valve SV, one method is to attach a control cable SV10 to the valve actuator SV1. Because this architecture pulls outward to open the valve, the cable SV10 can be attached directly. A poppet valve in place of this valve would rely on push actuation, therefore the cable SV10 pull would have to be converted to push. Direct pull may simplify parts, may utilize fewer parts, and may be more compact in size.

Control Cable Attachment/Detachment

A pocket has been machined into the end of the valve actuator SV1 that allows the cable head SV11 to be easily inserted and removed, but when tension is applied to the cable SV10, the cable head SV11 may be captive and unable to be removed. A slot in the housing mount SV3 and in the valve actuator SV1 allow for cable housing SV12 to be pulled out of the housing mount SV3, the cable SV10 then to be pulled out of the slots, and then the tension in the cable SV10 released to free the cable head SV11 from the valve actuator SV1. This solution does not require tools and can provide for simple installation and removal.

Example Dropper Post Implementations

With reference to FIG. 19, FIG. 20, FIGS. 21A, 21B, FIG. 22, FIGS. 23A, 23B, FIG. 24, FIG. 25, FIG. 26, in implementations, the linear actuator as disclosed herein, including the linear actuator as disclosed herein with the inverse spool valve as disclosed, is included in a height-adjustable seatpost ("dropper post") for a bicycle. More specifically, in an example, a dropper post is set forth as follows:

A. In an example, a dropper post comprises: a linear actuator, the linear actuator including: a fluid chamber; a piston chamber; and an inverse spool valve, the inverse spool valve including: a core, the core including at least one fluid channel having a piston chamber port and a fluid chamber port; and a sleeve, the sleeve extending around at least a portion of a periphery of the core and being movable between an open and a closed position, wherein when the sleeve is in the open position, a fluid path extends from the piston chamber, through the fluid channel, and into the fluid chamber; and when the sleeve is in the closed position, the piston chamber is sealed from the fluid chamber.

B. In an example of the dropper post of A, the inverse spool valve is configured such that fluid pressure acting on the inverse spool valve does not substantially bias the sleeve towards the open position or the closed position.

C. In an example of the dropper post of A, the inverse spool valve further comprises a biasing mechanism to bias the sleeve towards the open or closed position.

D. In an example of the dropper post of C, the biasing mechanism is a spring.

E. In an example of the dropper post of C, the biasing mechanism is configured to urge the sleeve towards the open or the closed position using fluid pressure.

F. In an example of the dropper post of A, the sleeve includes a sleeve extension, the sleeve extension comprising a first end and a second end disposed opposite the first end, the first end disposed within an outer body of the linear actuator and the second end configured to be disposed external to the outer body.

G. In an example of the dropper post of F, the inverse spool valve further comprises a first chamber seal, a second chamber seal, and an environment seal, the first and second chamber seals being disposed on opposing sides of the fluid chamber port of the fluid channel and the environment seal being disposed between the sleeve extension and a portion of the linear actuator.

H. In an example of the dropper post of G, the inverse spool valve further comprises a backup seal and, wherein, a separation volume is defined between the backup seal, the second chamber seal, the core, and the sleeve.

I. In an example of the dropper post of H, the inverse spool valve further comprises a spool valve port extending through the sleeve, the spool valve port fluidly coupling the separation volume to the fluid chamber.

J. In an example of the dropper post of F, the sleeve extension defines a cavity extending from the second end towards the first end, wherein the second end is an open end.

K. In an example of the dropper post of J, the sleeve includes a connector for receiving a control cable, the control cable being configured to exert a force on the connector and urge the sleeve toward the open or the closed position.

L. In an example of the dropper post of K, the connector and the sleeve are monolithic.

M. In an example of the dropper post of L, the dropper post further comprises the control cable, the control cable includes a head and the connector includes a pocket for receiving the head of the control cable, wherein the head of the control cable is retained in the pocket in response to a tension being applied to the control cable.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein.

Telescopic Linear Actuator with Self-Bleeding Hydraulics (LA)

| Figure Callout | Part/Feature |
| --- | --- |
| 1 | Gas Charge Valve |
| 2 | Mount |
| 3 | Piston Rod |
| 4 | Body |
| 5 | Piston Rod Seal |
| 6 | Piston Rod Bushing |
| 7 | Piston |
| 8 | Piston Seal |
| 9 | Backer Ring |
| 10 | Valve Actuator |
| 11 | Funnel |
| 12 | Needle |
| 13 | First Fluid Port |
| 14 | Bleed Seal |
| 15 | Second Fluid Port |
| 16 | Third Fluid Port |
| 17 | Fourth Fluid Port |
| 18 | Gas Charge Port |
| 19 | Valve Spring |
| 20 | Valve |
| 21 | Gas Liquid Interface (Reservoir Volume) |
| 22 | Gas Bubbles |
| 23 | First Fluid Pathway |
| 24 | Second Fluid Pathway |
| 25 | Piston Cylinder |
| 26 | Reservoir Tube |
| 27 | Cylinder Cap |
| 28 | Lower End Cap |
| 29 | Cable Housing Mount |
| 30 | Receptacle |

Balanced, Direct-Pull, Inverse Spool Valve (SV)

| Figure Callout | Part/Feature |
| --- | --- |
| SV1 (1) | Valve Actuator |
| SV2 (2) | Valve Core |
| SV3 (3) | Housing Mount |
| SV4 (4) | Lower End Cap (valve body) |
| SV5 (5) | First Fluid Port |
| SV6 (6) | Second Fluid Port |
| SV7 (7) | Inward High-Pressure Seal |
| SV8 (8) | Outward High-Pressure Seal |
| SV9 (9) | Spring (return bias member) |
| SV10 (10) | Cable |
| SV11 (11) | Cable Head |
| SV12 (12) | Cable Housing |
| SV13 (13) | First Breathe Port |
| SV14 (14) | Second Breathe Port |
| SV15 (15) | Environment Seal |
| SV16 (16) | Low-Pressure Seal (backup seal) |
| SV17 (17) | Volume A |
| SV18 (18) | Volume B |

| Figure Callout | Part/Feature |
|---|---|
| SV19 (19) | Volume A Bias Force |
| SV20 (20) | Volume B Bias Force |
| SV21 (21) | Environment Bias Force |

Dropper Post, Embodiment 1 (DP1): Balanced Inverse Spool Valve, Lower Receptacle

| Figure Callout | Part/Feature |
|---|---|
| 100 | High Pressure Valve Seal |
| 101 | Actuator Rod Seal (Environmental Seal) |
| 102 | Housing Mount Seal |
| 103 | Reservoir Seal |
| 104 | Valve Actuator |
| 105 | Anti-Rotation Pins |
| 106 | Bleed Seal |
| 107 | Cylinder Cap |
| 108 | Funnel |
| 109 | Gas Charge Valve |
| 110 | Cable Housing Mount |
| 111 | Low Pressure Valve Seal (Backup Seal) |
| 112 | Lower Bushing |
| 113 | Lower End Cap |
| 114 | Lower Retaining Ring |
| 115 | Lower Tube |
| 116 | Needle Guide |
| 117 | Piston |
| 118 | Piston Backer Ring |
| 119 | Piston Cylinder |
| 120 | Piston Cylinder Seal |
| 121 | Piston Rod |
| 122 | Piston Rod Bushing |
| 123 | Piston Seal |
| 124 | Reservoir Tube |
| 125 | Saddle Clamp Post Clamp |
| 126 | Saddle Clamp Rail Clamp |
| 127 | Upper Bushing |
| 128 | Upper End Cap (Mount) |
| 129 | Upper End Cap Seal |
| 130 | Upper Retaining Ring |
| 131 | Upper Tube (Stanchion) |
| 132 | Valve Core |
| 133 | Valve Spring |
| 134 | Wiper |
| 135 | Piston Rod Seal |
| 136 | Saddle Clamp Screw |
| 137 | Needle |
| 138 | Receptacle |
| 139 | First Fluid Port |
| 140 | Second Fluid Port |
| 141 | Third Fluid Port |
| 142 | Fourth Fluid Port |
| 143 | Gas Charge Port |
| 144 | First Fluid Pathway |
| 145 | Second Fluid Pathway |
| 146 | First Breathe Port |
| 147 | Second Breathe Port |

Dropper Post, Embodiment 2 (DP2): Poppet Valve, Lower Receptacle

| Figure Callout | Part/Feature |
|---|---|
| 200 | High Pressure Valve Seal |
| 203 | Reservoir Seal |
| 204 | Valve Actuator (Poppet) |
| 205 | Anti-Rotation Pins |
| 206 | Bleed Seal |
| 207 | Cylinder Cap |
| 208 | Funnel |
| 209 | Gas Charge Valve |
| 211 | Low Pressure Valve Seal |
| 212 | Lower Bushing |
| 213 | Mount |
| 214 | Lower Retaining Ring |
| 215 | Lower Tube |
| 217 | Piston |
| 218 | Piston Backer Ring |
| 219 | Piston Cylinder |
| 220 | Piston Cylinder Seal |
| 221 | Piston Rod |
| 222 | Piston Rod Bushing |
| 223 | Piston Seal |
| 224 | Reservoir Tube |
| 225 | Saddle Clamp Post Clamp |
| 226 | Saddle Clamp Rail Clamp |
| 227 | Upper Bushing |
| 228 | Upper End Cap |
| 229 | Upper End Cap Seal |
| 230 | Upper Retaining Ring |
| 231 | Upper Tube (Stanchion) |
| 233 | Valve Spring |
| 234 | Wiper |
| 235 | Piston Rod Seal |
| 236 | Saddle Clamp Screw |
| 237 | Needle |
| 238 | Receptacle |
| 239 | First Fluid Port |
| 240 | Second Fluid Port |
| 241 | Third Fluid Port |
| 242 | Fourth Fluid Port |
| 243 | Gas Charge Port |
| 244 | First Fluid Pathway |
| 245 | Second Fluid Pathway |

Dropper Post, Embodiment 3 (DP3): Poppet Valve, Lower Receptacle

| Figure Callout | Part/Feature |
|---|---|
| 300 | High Pressure Valve Seal |
| 303 | Reservoir Seal |
| 304 | Valve Actuator (Poppet) |
| 305 | Anti-Rotation Pins |
| 306 | Bleed Seal |
| 307 | Cylinder Cap |
| 308 | Funnel |
| 309 | Gas Charge Valve |
| 310 | Cable Housing Mount |
| 311 | Low Pressure Valve Seal |
| 312 | Lower Bushing |
| 313 | Lower End Cap |
| 314 | Lower Retaining Ring |
| 315 | Lower Tube |
| 316 | Needle Guide |
| 317 | Piston |
| 318 | Piston Backer Ring |
| 319 | Piston Cylinder |
| 320 | Piston Cylinder Seal |
| 321 | Piston Rod |
| 322 | Piston Rod Bushing |
| 323 | Piston Seal |
| 324 | Reservoir Tube |
| 325 | Saddle Clamp Post Clamp |
| 326 | Saddle Clamp Rail Clamp |
| 327 | Upper Bushing |
| 328 | Upper End Cap (Mount) |
| 329 | Upper End Cap Seal |
| 330 | Upper Retaining Ring |
| 331 | Upper Tube (Stanchion) |
| 334 | Wiper |
| 335 | Piston Rod Seal |
| 336 | Saddle Clamp Screw |
| 337 | Needle |
| 338 | Receptacle |
| 339 | First Fluid Port |
| 340 | Second Fluid Port |

-continued

| Figure Callout | Part/Feature |
| --- | --- |
| 341 | Third Fluid Port |
| 342 | Fourth Fluid Port |
| 343 | Gas Charge Port |
| 344 | First Fluid Pathway |
| 345 | Second Fluid Pathway |

Dropper Post, Embodiment 4 (DP4): Poppet Valve, Upper Receptacle

| Figure Callout | Part/Feature |
| --- | --- |
| 400 | High Pressure Valve Seal |
| 402 | Housing Mount Seal |
| 403 | Reservoir Seal |
| 404 | Valve Actuator (Poppet) |
| 405 | Anti-Rotation Pins (not shown) |
| 406 | Bleed Seal |
| 407 | Cylinder Cap |
| 408 | Funnel |
| 409 | Gas Charge Valve |
| 410 | Cable Housing Mount |
| 411 | Low Pressure Valve Seal |
| 412 | Lower Bushing |
| 413 | Lower End Cap |
| 414 | Lower Retaining Ring |
| 415 | Lower Tube |
| 417 | Piston |
| 418 | Piston Backer Ring |
| 419 | Piston Cylinder |
| 420 | Piston Cylinder Seal |
| 421 | Piston Rod |
| 422 | Piston Rod Bushing |
| 423 | Piston Seal |
| 424 | Reservoir Tube |
| 425 | Saddle Clamp Post Clamp |
| 426 | Saddle Clamp Rail Clamp |
| 427 | Upper Bushing |
| 428 | Upper End Cap (Mount) |
| 429 | Upper End Cap Seal |
| 430 | Upper Retaining Ring |
| 431 | Upper Tube (Stanchion) |
| 432 | Valve Body |
| 433 | Valve Spring |
| 434 | Wiper |
| 435 | Piston Rod Seal |
| 436 | Saddle Clamp Screw |
| 437 | Needle |
| 438 | Receptacle |
| 439 | First Fluid Port |
| 440 | Second Fluid Port |
| 441 | Third Fluid Port |
| 442 | Fourth Fluid Port |
| 443 | Gas Charge Port |
| 444 | First Fluid Pathway |
| 445 | Second Fluid Pathway |

The invention claimed is:

1. A linear actuator system, comprising:
a linear actuator, the linear actuator comprising:
an outer body;
an inner body disposed within the outer body;
a fluid chamber at least partially extending between the inner body and the outer body;
a piston chamber extending at least partially within the inner body;
a valve configured to selectively fluidly couple the fluid chamber and the piston chamber to each other;
a piston assembly comprising a piston, the piston assembly disposed within the piston chamber;
a variable volume within the piston chamber that extends between the piston and the valve; and
a gas collector assembly including a fluid passageway;
wherein a movement of the piston assembly causes a gas separated from a liquid within the variable volume to flow through the fluid passageway, through the valve, and into the fluid chamber,
wherein the gas collector assembly comprises a needle extending from the piston assembly generally towards the valve, the needle defining at least a portion of the fluid passageway.

2. The linear actuator system of claim 1, wherein a movement of the piston assembly generally towards the valve causes at least a portion of the needle to be received within a receptacle.

3. The linear actuator system of claim 1, further comprising a dropper seat post.

4. A linear actuator system, comprising:
a linear actuator, the linear actuator comprising:
an outer body;
an inner body disposed within the outer body;
a fluid chamber at least partially extending between the inner body and the outer body;
a piston chamber extending at least partially within the inner body;
a valve configured to selectively fluidly couple the fluid chamber and the piston chamber to each other;
a piston assembly comprising a piston, the piston assembly disposed within the piston chamber;
a variable volume within the piston chamber that extends between the piston and the valve; and
a gas collector assembly including a fluid passageway;
wherein a movement of the piston assembly causes a gas separated from a liquid within the variable volume to flow through the fluid passageway, through the valve, and into the fluid chamber,
wherein the gas collector assembly comprises a receptacle formed within the piston assembly, the receptacle defining at least a portion of the fluid passageway.

5. The linear actuator system of claim 4, wherein the piston assembly comprises the piston and a receptacle body coupled to the piston, the receptacle body defining, at least in part, the receptacle.

6. The linear actuator system of claim 4, wherein the piston defines, at least in part, the receptacle.

7. The linear actuator system of claim 4, further comprising a dropper seat post.

8. The linear actuator system of claim 4, wherein a movement of the piston assembly generally towards the valve causes the receptacle to receive at least a portion of a needle.

9. A linear actuator system, comprising:
a linear actuator, the linear actuator comprising:
an outer body;
an inner body disposed within the outer body;
a fluid chamber at least partially extending between the inner body and the outer body;
a piston chamber extending at least partially within the inner body;
a valve configured to selectively fluidly couple the fluid chamber and the piston chamber to each other;
a piston assembly comprising a piston, the piston assembly disposed within the piston chamber;
a variable volume within the piston chamber that extends between the piston and the valve; and
a gas collector assembly including a fluid passageway;
wherein a movement of the piston assembly causes a gas separated from a liquid within the variable volume to flow through the fluid passageway, through the valve, and into the fluid chamber,
wherein the gas collector assembly comprises a needle that extends from an end region of the piston chamber and generally towards the piston assembly, the needle defining at least a portion of the fluid passageway.

10. The linear actuator system of claim 9, wherein a movement of the piston assembly generally towards the needle causes at least a portion of the needle to be received within a receptacle.

11. The linear actuator system of claim 9, further comprising a dropper seat post.

12. A linear actuator system, comprising:
a linear actuator, the linear actuator comprising:
an outer body;
an inner body disposed within the outer body;
a fluid chamber at least partially extending between the inner body and the outer body;
a piston chamber extending at least partially within the inner body;
a valve configured to selectively fluidly couple the fluid chamber and the piston chamber to each other;
a piston assembly comprising a piston, the piston assembly disposed within the piston chamber;
a variable volume within the piston chamber that extends between the piston and the valve; and
a gas collector assembly including a fluid passageway;
wherein a movement of the piston assembly causes a gas separated from a liquid within the variable volume to flow through the fluid passageway, through the valve, and into the fluid chamber,
wherein the gas collector assembly comprises a receptacle for receiving at least a portion of a needle, the receptacle defining at least a portion of the fluid passageway.

13. The linear actuator system of claim 12, wherein the receptacle and the valve are monolithic.

14. The linear actuator system of claim 12, wherein the receptacle and the piston are monolithic.

15. The linear actuator system of claim 12, further comprising a dropper seat post.

16. A linear actuator system, comprising:
a linear actuator, the linear actuator comprising:
an outer body;
an inner body disposed within the outer body;
a fluid chamber at least partially extending between the inner body and the outer body;
a piston chamber extending at least partially within the inner body;
a valve configured to selectively fluidly couple the fluid chamber and the piston chamber to each other;
a piston assembly comprising a piston, the piston assembly disposed within the piston chamber;
a variable volume within the piston chamber that extends between the piston and the valve; and
a gas collector assembly including a fluid passageway;
wherein a movement of the piston assembly causes a gas separated from a liquid within the variable volume to flow through the fluid passageway, through the valve, and into the fluid chamber,
wherein the gas collector assembly further comprises a funnel, the funnel urging gas separated from a liquid towards an inlet of the fluid passageway.

17. The linear actuator system of claim 16, wherein the gas collector assembly further comprises a needle, the needle defining at least a portion of the fluid passageway.

18. The linear actuator system of claim 16, wherein the gas collector assembly further comprises a receptacle for receiving at least a portion of a needle, the needle defining at least a portion of the fluid passageway.

19. The linear actuator system of claim 16, further comprising a dropper seat post.

20. A linear actuator system, comprising:
a linear actuator, the linear actuator comprising:
an outer body;
an inner body disposed within the outer body;
a fluid chamber at least partially extending between the inner body and the outer body;
a piston chamber extending at least partially within the inner body;
a valve configured to selectively fluidly couple the fluid chamber and the piston chamber to each other;
a piston assembly comprising a piston, the piston assembly disposed within the piston chamber;
a variable volume within the piston chamber that extends between the piston and the valve; and
a gas collector assembly including a fluid passageway;
wherein a movement of the piston assembly causes a gas separated from a liquid within the variable volume to flow through the fluid passageway, through the valve, and into the fluid chamber,
wherein the valve is an inverse spool valve.

21. The linear actuator system of claim 20, wherein the inverse spool valve comprises:
a core, the core including at least one fluid channel having a piston chamber port and a fluid chamber port; and
a sleeve, the sleeve extending around at least a portion of a periphery of the core and being movable between an open and a closed position, wherein
when the sleeve is in the open position, a fluid path extends from the variable volume, through the fluid channel, and into the fluid chamber; and
when the sleeve is in the closed position, the variable volume is sealed from the fluid chamber.

22. The linear actuator system of claim 21, wherein the inverse spool valve is configured such that fluid pressure acting on the inverse spool valve does not substantially bias the sleeve towards the open position or the closed position.

23. The linear actuator system of claim 21, wherein the inverse spool valve further comprises a biasing mechanism to bias the sleeve towards the open or closed position.

24. The linear actuator system of claim 23, wherein the biasing mechanism is a spring.

25. The linear actuator system of claim 23, wherein the biasing mechanism is configured to urge the sleeve towards the open or the closed position using fluid pressure.

26. The linear actuator system of claim 21, wherein the sleeve includes a sleeve extension, the sleeve extension comprising a first end and a second end disposed opposite the first end, the first end disposed within the outer body and the second end configured to be disposed external to the outer body.

27. The linear actuator system of claim 26, wherein the inverse spool valve further comprises a first chamber seal, a second chamber seal, and an environment seal, the first and second chamber seals being disposed on opposing sides of the fluid chamber port of the fluid channel and the environment seal being disposed between the sleeve extension and the outer body.

28. The linear actuator system of claim 27, wherein the inverse spool valve further comprises a backup seal and, wherein, a separation volume is defined between the backup seal, the second chamber seal, the sleeve, and the core.

29. The linear actuator system of claim 28, wherein the inverse spool valve further comprises a spool valve port extending through the sleeve, the spool valve port fluidly coupling the separation volume to the fluid chamber.

30. The linear actuator system of claim 26, wherein the sleeve extension defines a cavity extending from the second end towards the first end, wherein the second end is an open end.

31. The linear actuator system of claim 30, wherein the sleeve includes a connector for receiving a control cable, the control cable being configured to exert a force on the connector and urge the sleeve toward the open or the closed position.

32. The linear actuator system of claim 31, wherein the connector and the sleeve are monolithic.

33. The linear actuator system of claim 32, further comprising the control cable, the control cable including a head and the connector includes a pocket for receiving the head of the control cable, wherein the head of the control cable is retained in the pocket in response to a tension being applied to the control cable.

34. The linear actuator system of claim 20, further comprising a dropper seat post.

* * * * *